United States Patent
Cohen et al.

(10) Patent No.: US 12,216,341 B2
(45) Date of Patent: Feb. 4, 2025

(54) WIRELESS SMARTGLASSES WITH QUICK CONNECT FRONT FRAMES

(71) Applicant: Lucyd Ltd., London (GB)

(72) Inventors: David Cohen, Aventura, FL (US); Clifford M Gross, Miami, FL (US); Harrison Gross, North Miami, FL (US)

(73) Assignee: Lucyd Ltd., London (GB)

( * ) Notice: Subject to any disclaimer, the term of this patent is extended or adjusted under 35 U.S.C. 154(b) by 888 days.

(21) Appl. No.: 17/104,849

(22) Filed: Nov. 25, 2020

(65) Prior Publication Data

US 2021/0082011 A1    Mar. 18, 2021

Related U.S. Application Data

(63) Continuation-in-part of application No. 16/022,097, filed on Jun. 28, 2018, now Pat. No. 10,908,419.

(Continued)

(51) Int. Cl.
| | |
|---|---|
| G02C 5/14 | (2006.01) |
| G02C 5/22 | (2006.01) |
| G06F 1/16 | (2006.01) |
| G06F 3/01 | (2006.01) |
| G06F 3/04842 | (2022.01) |
| G06F 3/16 | (2006.01) |

(Continued)

(52) U.S. Cl.
CPC ........... *G02C 5/146* (2013.01); *G02C 5/2209* (2013.01); *G06F 1/163* (2013.01); *G06F 3/011* (2013.01); *G06F 3/04842* (2013.01); *G06F 3/167* (2013.01); *G06Q 30/0601* (2013.01); *H04M 1/72409* (2021.01); *G02C 11/10* (2013.01); *G02C 2200/08* (2013.01); *G02C 2200/20* (2013.01); *H04M 1/72412* (2021.01)

(58) Field of Classification Search
USPC .................................................. 351/116, 121
See application file for complete search history.

(56) References Cited

U.S. PATENT DOCUMENTS

| | | | |
|---|---|---|---|
| 4,904,078 A | 2/1990 | Gorike | |
| 7,073,904 B2 * | 7/2006 | Chene | G02C 5/2218 351/153 |

(Continued)

FOREIGN PATENT DOCUMENTS

| | | |
|---|---|---|
| CN | 103309226 A | 9/2013 |
| CN | 203313378 U | 11/2013 |

(Continued)

OTHER PUBLICATIONS

Pair Eyewear glasses, Accessed Jan. 13, 2021, https://paireyewear.com/.

(Continued)

*Primary Examiner* — Darryl J Collins
(74) *Attorney, Agent, or Firm* — Ellenoff Grossman & Schole LLP; John C. Stellabotte; Danielle Cohen

(57) ABSTRACT

Smartglasses comprising a removable and replaceable front frame comprising hinges or hinge elements and temples releasably connected to the hinges or hinge elements. The front frame contains no electrical wiring that connects the temples and is configured to be removed and replaced without affecting electronic connection with the temples or any devices or systems paired or connected with the temples.

17 Claims, 19 Drawing Sheets

Related U.S. Application Data

(60) Provisional application No. 62/941,466, filed on Nov. 27, 2019.

(51) Int. Cl.
*G06Q 30/0601* (2023.01)
*H04M 1/72409* (2021.01)
*G02C 11/00* (2006.01)
*H04M 1/72412* (2021.01)

(56) References Cited

U.S. PATENT DOCUMENTS

| | | | |
|---|---|---|---|
| 7,192,136 B2* | 3/2007 | Howell | G02C 11/10 351/158 |
| 7,237,892 B2* | 7/2007 | Curci | G02C 5/04 351/119 |
| 7,255,437 B2 | 8/2007 | Howell et al. | |
| 7,380,936 B2 | 6/2008 | Howell et al. | |
| 7,401,918 B2 | 7/2008 | Howell et al. | |
| 7,438,410 B1 | 10/2008 | Howell et al. | |
| 7,481,531 B2 | 1/2009 | Howell et al. | |
| 7,500,746 B1 | 3/2009 | Howell et al. | |
| 7,500,747 B2 | 3/2009 | Howell et al. | |
| 7,581,833 B2 | 9/2009 | Howell et al. | |
| 7,621,634 B2 | 11/2009 | Howell et al. | |
| 7,677,723 B2 | 3/2010 | Howell et al. | |
| 7,771,046 B2 | 8/2010 | Howell et al. | |
| 8,109,629 B2 | 2/2012 | Howell et al. | |
| 8,337,013 B2 | 12/2012 | Howell et al. | |
| 8,430,507 B2 | 4/2013 | Howell et al. | |
| 8,434,863 B2 | 5/2013 | Howell et al. | |
| 8,465,151 B2 | 6/2013 | Howell et al. | |
| 8,500,271 B2 | 8/2013 | Howell et al. | |
| 8,770,742 B2 | 7/2014 | Howell et al. | |
| 8,905,542 B2 | 12/2014 | Howell et al. | |
| 9,033,493 B2 | 5/2015 | Howell et al. | |
| 9,081,213 B2 | 7/2015 | Weinberg | |
| 9,201,578 B2 | 12/2015 | Scott et al. | |
| 9,253,806 B2 | 2/2016 | Choi et al. | |
| 9,277,159 B2 | 3/2016 | Shin et al. | |
| 9,488,520 B2 | 11/2016 | Howell et al. | |
| 9,535,497 B2 | 1/2017 | Rose et al. | |
| 9,547,184 B2 | 1/2017 | Howell et al. | |
| 9,589,390 B2 | 3/2017 | Destories et al. | |
| 9,690,121 B2 | 6/2017 | Howell et al. | |
| 9,753,303 B2 | 9/2017 | Billetz et al. | |
| 9,910,298 B1 | 3/2018 | Sales et al. | |
| 9,929,987 B2 | 3/2018 | Bouzid et al. | |
| 10,037,084 B2 | 7/2018 | Joo | |
| 10,042,186 B2 | 8/2018 | Chao et al. | |
| 10,060,790 B2 | 8/2018 | Howell et al. | |
| 10,061,144 B2 | 8/2018 | Howell et al. | |
| 10,310,296 B2 | 6/2019 | Howell et al. | |
| 10,330,956 B2 | 6/2019 | Howell et al. | |
| 10,345,625 B2 | 7/2019 | Howell et al. | |
| 10,359,311 B2 | 7/2019 | Howell et al. | |
| 10,412,633 B1 | 9/2019 | Kotecha et al. | |
| 10,437,437 B1 | 10/2019 | Ledet | |
| 10,539,459 B2 | 1/2020 | Howell et al. | |
| 10,777,018 B2 | 9/2020 | Varady et al. | |
| 10,908,419 B2* | 2/2021 | Gross | G02B 27/017 |
| 11,042,045 B2 | 6/2021 | Chao et al. | |
| 11,086,147 B2 | 8/2021 | Howell et al. | |
| 11,204,512 B2 | 12/2021 | Howell et al. | |
| 11,243,416 B2 | 2/2022 | Howell et al. | |
| 11,326,941 B2 | 5/2022 | Howell et al. | |
| 11,513,371 B2 | 11/2022 | Howell et al. | |
| 11,536,988 B2 | 12/2022 | Howell et al. | |
| 11,630,331 B2 | 4/2023 | Howell et al. | |
| 11,644,361 B2 | 5/2023 | Howell et al. | |
| 11,644,693 B2 | 5/2023 | Howell et al. | |
| 11,721,183 B2 | 8/2023 | Howell et al. | |
| 11,733,549 B2 | 8/2023 | Howell et al. | |
| 11,762,224 B2 | 9/2023 | Howell et al. | |
| 11,803,069 B2 | 10/2023 | Howell et al. | |
| 11,829,518 B1 | 11/2023 | Howell et al. | |
| 2007/0220108 A1 | 9/2007 | Whitaker | |
| 2009/0097688 A1 | 4/2009 | Lewis | |
| 2009/0296044 A1* | 12/2009 | Howell | G02C 5/143 351/158 |
| 2010/0296045 A1* | 11/2010 | Agnoli | G02C 5/146 351/158 |
| 2012/0004919 A1 | 1/2012 | Muth | |
| 2012/0200499 A1 | 8/2012 | Osterhout et al. | |
| 2013/0177194 A1 | 7/2013 | Han et al. | |
| 2013/0235328 A1* | 9/2013 | Cauvet | G02C 11/10 351/116 |
| 2014/0140531 A1 | 5/2014 | Lee et al. | |
| 2014/0336781 A1 | 11/2014 | Katyal et al. | |
| 2015/0100621 A1 | 4/2015 | Pan | |
| 2015/0180809 A1 | 6/2015 | Doulton | |
| 2015/0289217 A1 | 10/2015 | Ban et al. | |
| 2015/0358614 A1 | 12/2015 | Jin | |
| 2015/0379896 A1 | 12/2015 | Yang et al. | |
| 2016/0026253 A1 | 1/2016 | Bradski et al. | |
| 2016/0070439 A1 | 3/2016 | Bostick et al. | |
| 2016/0078512 A1 | 3/2016 | Yopp et al. | |
| 2016/0109729 A1* | 4/2016 | Swab | B29D 12/02 351/116 |
| 2016/0236614 A1 | 8/2016 | Heo | |
| 2017/0103440 A1 | 4/2017 | Xing et al. | |
| 2018/0091452 A1 | 3/2018 | Hviid | |
| 2018/0144554 A1 | 5/2018 | Natola et al. | |
| 2018/0277123 A1 | 9/2018 | Boesen et al. | |
| 2019/0089456 A1 | 3/2019 | Kasilya Sudarsan et al. | |
| 2019/0306105 A1 | 10/2019 | Snibbe | |
| 2019/0378515 A1 | 12/2019 | Kim et al. | |
| 2020/0004016 A1 | 1/2020 | Gross et al. | |
| 2020/0292843 A1 | 9/2020 | Villalpando et al. | |

FOREIGN PATENT DOCUMENTS

| | | | |
|---|---|---|---|
| CN | 103713737 A | 4/2014 | |
| CN | 105354161 A | 2/2016 | |
| EP | 1857856 A1 | 11/2007 | |
| EP | 2739055 A1 | 6/2014 | |
| KR | 20120139195 A | 12/2012 | |
| KR | 200465087 Y1 | 2/2013 | |
| WO | 2013171731 A1 | 11/2013 | |
| WO | 2017031033 A1 | 2/2017 | |
| WO | 2017096099 A1 | 6/2017 | |
| WO | 2018059934 A1 | 4/2018 | |

OTHER PUBLICATIONS

Zungle. Online. Internet. Accessed Apr. 24, 2019. https://www.zungleinc.com.

Lucyd Upgrade Your Eyewear. Online. Internet. Accessed Apr. 24, 2019. https://www.lucyd.co/.

Bose Frames Audio Sunglasses, Black. Online. Internet. Accessed Sep. 27, 2019. https://www.amazon.com/Bose-Frames-Audio-Sunglasses-Black/dp/B07P7VVCDD/ref=asc_df_B07P7VVCDD/?ag=hyprod-20&linkCode=df0&hvadid . . . .

Amazon Smart Bluetooth Headset Glasses, Detachable Outdoor Car Universal HD Polarized Sunglasses for Driving, Outdoor Fish . . . Online. Internet. Accessed Oct. 1, 2019. https://www.amazon.com/Smart-Bluetooth-Detachable-Universal-Sunglasses/dp/B07QHS5G9M.

Amazon Kodak Prescription Eyeglasses Alien 5 Bone Conduction Glasses Blue Ray Filtering Wireless Bluetooth 4.1 Headphones Myopia Hyperopia Astigmatism Waterproof for IOS Android (Bright Black Frame). Online. Internet. Accessed Oct. 1, 2019. https://www.amazon.com/Prescription-Eyeglasses-Conduction-Headphones-Astigmatism/dp/B07NTDJ9N7/ref=sr_1_3?keywords=smart+glasses+pre . . . .

Amazon Duco Sunglasses for Men Over Glasses Sunglasses for Women Polarized Sunglasses 8953. Online. Internet. Accessed Sep. 27, 2019. https://www.amazon.com/dp/B07MZ2CT99?ref_=ams_ad_dp_ovrl.

(56) References Cited

OTHER PUBLICATIONS

Proof of Concept Optical Engineering, LLC. "Review of Smartglasses Demonstrated at CES 2018." Jan. 17, 2018.
WaveOptics Ltd. "Unlocking Augmented Reality with World Class Optical Technology," 2018.
Hadar, et al. "Working Memory Load Affects Processing Time in Spoken Word Recognition: Evidence from Eye-Movements." Frontiers in Neuroscience, May 19, 2016.
Jones, Skott E. "Adult Word Learning as a Function of Neighborhood Density." Languages, Mar. 6, 2018.
Karthika, et al. "Hololens." International Journal of Computer Science and Mobile Computing, vol. 6, Issue 2, Feb. 2017, pp. 41-50.
Lenovo Group Limited. "Lenovo™ New Glass C200 Adds Smart Glasses to Portfolio." Online. Internet. Published Jan. 3, 2017. Accessed Jul. 12, 2018. http://blog.lenovo.com/en/blog/lenovo-new-glass-c200-adds-smart-glasses-to-portfolio/.
Shen, et al. "Semantic information mediates visual attention during spoken word recognition in Chinese: Evidence from the printed-word version of the visual-world paradigm." Attention, Perception, & Psychophysics, Jul. 2016. vol. 78, Issue 5, pp. 1267-1284.
Vuzix Corporation. "M100 Smart Glasses Product Guide, Enterprise Edition." Product Manual, 2015.
AliExpress Newest Bluetooth headset sunglasses music microphone bone conduction Open type headset touch control compatible with myopia lens. Online. Internet. Accessed Apr. 24, 2019. https://www.aliexpress.com/item/Newest-Bluetooth-headset-sunglasses-music-microphone-bone-conduction-Open-type-headset-touch-control-compatible-with-myopia/32839211496.html?spm=2114.search0104.3.9.21df694c14Mfwl&ws_ab_test=searchweb0_0,searchweb201602_8_10065_10130 10068_10890_10547_319_10546_317_10548_10545_10696_453 10084_454 . . . .
Amazon Vocal Skull Alien 5 Bone Conduction Glasses Polarized Sunglasses Headphones Headset Music Stereo Hearing Aid for Sports Running Cycling Hiking iOS Android Matted Black Frame (Frame+Mold Lens). Online. Internet. Accessed Apr. 24, 2019. https://www.amazon.com/Vocal-Skull-Conduction-Sunglasses-Headphones/dp/B07KLSSQST.
Bose Frames Alto. Online Internet. Accessed Apr. 24, 2019. https://www.bose.com/en_us/products/wearables/frames/bose-frames-alto.html.
Bose Frames Rondo. Online. Internet. Accessed Apr. 24, 2019. https://www.bose.com/en_us/products/wearables/frames/bose-frames-rondo.html.
Bose Frames. Online. Internet. Accessed Apr. 24, 2019. https://www.bose.com/en_us/products/wearables/frames.html.
U.S. Appl. No. 16/829,841, filed Mar. 25, 2020.

* cited by examiner

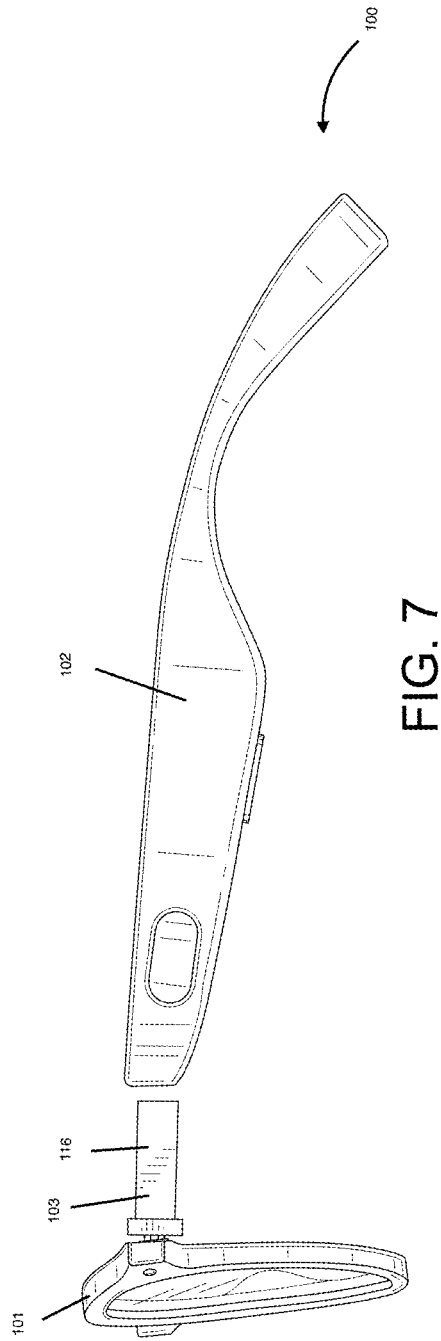
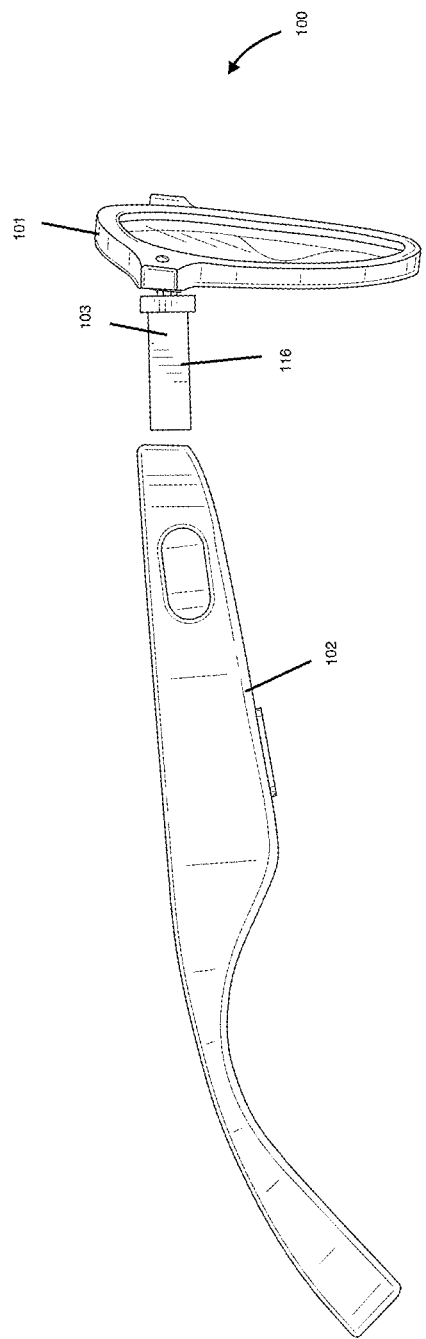
FIG. 7
FIG. 8

WIRELESS SMARTGLASSES WITH QUICK CONNECT FRONT FRAMES

CROSS REFERENCE TO RELATED APPLICATIONS

This application claims the benefit of Provisional Application No. 62/941,466, filed on Nov. 27, 2019, and is a continuation-in-part and claims the benefit of U.S. patent application Ser. No. 16/022,097, filed Jun. 28, 2018, the entire disclosures of which are incorporated herein by reference.

FIELD OF THE INVENTION

The present invention relates to the field of glasses, and in particular to a kind of wireless connection-enabled smartglasses having quick connect front frames.

BACKGROUND

Traditionally, glasses such as reading glasses, corrective eyeglasses, and sunglasses are purchased for the utility of the lenses, whether it is to help a user see clearly, read, or protect the user's eyes from the sun. Typically, consumers interested in purchasing these various types of glasses take the price and fashion aspects of these glasses into strong consideration when purchasing these products. Additionally, newer functions have been introduced to traditional glasses which allow users to electronically connect their glasses to their mobile or other electronic devices, for example to allow users to play music, access their digital assistants and take calls. However, these prior developed smart electronic glasses lack the ability to quickly and easily modify the front frame or outwards facing design of the glasses, while retaining the ability to electronically connect the smartglasses to mobile or other electronic devices and replaced without affecting any electronic connection between the temples or any devices or systems paired or connected to the smartglasses, and therefore may limit smartglasses users to the front frame type or style of the glasses as originally purchased. However, front frame styles typically vary widely in color, style, and shape and it would be advantageous and desirable to smartglasses users to be able to use their smartglasses temples with different front frames, while retaining the functions of being able to connect their smartglasses with other mobile devices.

Moreover, some glasses and/or smartglasses presently known in the art may include the functionality of modifiable front frames, however, such glasses and/or smartglasses require connection of the front frames by means of magnets or screws, or otherwise by connection means that are not capable of avoiding disruption between electronics components, if any, in the temples of the glasses. For example, the Pair Eyewear glasses (https://paireyewear.com/) (hereinafter the "Pair Glasses") require magnets to connect the front frames of the glasses to a base front frame via magnet connectors. Also for example, the glasses described in U.S. Pat. No. 9,081,213 are glasses that comprise a frame portion which is connectable to the temples by at least one of a magnet and a screw. Moreover, the glasses disclosed in K.R. App. No. 20120139195 provide a means for connecting glasses temples to compatible front frames, however, such glasses do not provide articulable hinges to permit the connected temples to articulate relative to the front frames once appropriately connected. Furthermore, such glasses do not provide a means of connecting the temples to the front frames and replacing them without affecting the connectivity of any electronics components in the device or paired or connected to the device.

Some glasses, for example, the glasses disclosed in K.R. App. No. 200465087, are glasses which connect the glasses lenses to the glasses temples in a manner that permits easy assembly and detachment of each individual lens frame, as opposed to connection of the entirety of the front frame and lenses to the glasses temples.

Other glasses presently known in the art solely permit the interchanging of the glasses lenses, and not the front frames of the glasses. For example, the glasses described in U.S. Pat. No. 9,753,303 are glasses which have quickly removable and replaceable eyeglasses lenses, but do not provide a means for exchanging the glasses front frames. Also for example, the glasses described in E.P. App. No. 1,857,856 are glasses which have optical glasses which are made removable with respect to the frame, but do not provide a means for exchanging the front frames holding the optical glasses.

Therefore, there is a need in the art for a cost-effective electronic smartglasses headset that are configured with Bluetooth® or other similar technology, including the technology disclosed in U.S. application Ser. No. 16/022,097 entitled SMARTGLASSES AND METHODS AND SYSTEMS FOR USING ARTIFICIAL INTELLIGENCE TO CONTROL MOBILE DEVICES USED FOR DISPLAYING AND PRESENTING TASKS AND APPLICATIONS AND ENHANCING PRESENTATION AND DISPLAY OF AUGMENTED REALITY INFORMATION, to connect and control the headset from a mobile or other electronic device, and which provides users with the ability to quickly change between various front frame designs, for example, to update the style of the glasses, as desired by the user, while retaining the functions of being able to connect and electronically pair their smartglasses with other mobile devices without affecting the connectivity of the electronics in the smartglasses or to other devices or systems paired or connected to the smartglasses. These and other features and advantages of the present invention will be explained and their utility and benefit will become understandable to one skilled in the art through the summary of the invention that follows.

SUMMARY OF THE INVENTION

As described in further detail herein below, the methods and systems, and devices described herein employ a novel design for glasses enabled with wireless communication technology and configured with quick connect hinges to easily, inexpensively and efficiently change or update the front frame of smartglasses devices. In some embodiments, the front frames contain no electronic wiring to facilitate the easy removal and connection of the front frame without requiring the disconnection of any electronic wires affecting the connectivity and functions of the smartglasses.

In some embodiments, the quick connect hinges may be flat hinges or pivot hinges that releasably connect to the temples of the smartglasses in a friction fit where the receiving holes to create the friction fit may be on the temples or on the front frames.

In accordance with embodiments of the present invention, a smartglasses device may comprise a removable front frame comprising hinges and rims, the rims comprising lenses, and temples releasably connected to the hinges, wherein the hinges and the temples connect by a friction fit and at least one of the temples comprise electronics components configured and programmed to transmit and receive electronic signals.

In accordance with embodiments of the present invention, at least one of the temples may comprise a printed circuit board, battery, microphone, speakers, connectivity module, cellular communications unit and hardware, and artificial intelligence interface in electronic communication, the connectivity module and the cellular communications unit and hardware configured and programmed to pair or connect the smartglasses to a smartphone, smartwatch, or other devices or systems and support active priority for the smartphone, the smartwatch, or the other device or systems, the smartglasses configured and programmed to receive oral requests or commands at the microphone and artificial intelligence interface to perform mobile device tasks or applications and process and communicate the oral requests or commands to a mobile device application controlling paired or connected devices or systems used for display or presentation of information related to the requested or commanded tasks or applications, the mobile device application and the artificial intelligence interface are programmed or configured to control paired or connected devices used for display or presentation of information related to requested or commanded tasks or applications and to display or present information related to the requested or commanded tasks or applications on the smartglasses, a paired or connected smartwatch, smartphone, or other paired or connected devices or systems, based on default settings, and to activate connections between the paired or connected smartglasses, smartphone, the smartwatch or additional devices or systems having higher priority until a capacity for connection with the smartglasses, the smartphone, the smartwatch, or other paired or connected devices or systems is reached, and receive at the microphone oral commands to override or switch the default settings and display or present information on a paired or connected as specified in the override or switch commands at the microphone and artificial intelligence and process and communicate the oral requests or commands to the mobile device application controlling paired or connected devices used for display or presentation of information related to requested or commanded tasks or applications switch display from a mobile device specified in the default settings to the paired or connected device or devices specified in the switch or override command.

In accordance with embodiments of the present invention, the smartglasses device may be controlled by a smartglasses mobile application, wherein the mobile device application controlling paired or connected devices used for display or presentation of information related to requested or commanded tasks or applications is the smartglasses mobile application.

In accordance with embodiments of the present invention, the front frame may contain no electrical wiring that connects to the temples.

In accordance with embodiments of the present invention, the front frame may be configured to be removed from each of the temples and replaced without affecting any electronic connection between the temples and the front frame or any devices or systems paired or connected to the temples of the smartglasses.

In accordance with embodiments of the present invention, the hinges may each comprise an insert component having a first end pivotally connected to the front frame and a second end adapted to releasably connect with the temple receiving holes. In some embodiments, the insert components may be substantially flat. In some embodiments, the insert components may further comprise one or more tab elements substantially corresponding in size and orientation to openings in one or more interior side walls of the receiving holes to selectively secure the temples to the front frame.

In accordance with embodiments of the present invention, the hinges may be pivot hinges having rounded profiles that releasably connect to the temples at receiving holes of corresponding size in the temples.

In accordance with embodiments of the present invention, a smartglasses device may comprise a front frame comprising a bridge member connecting a pair of rims having a pair of lenses disposed therein, and a pair of hinge elements comprising an insert component having a first end opposite a second end, with the first end pivotally connected to the front frame, and a pair of temples, each having a hinge receiving hole adapted to releasably connect with the second end of the insert component, at least one of the temples further comprising a connectivity module configured to wirelessly connect the temples to a mobile device. In some embodiments, the insert components may be substantially flat and may releasably connect to corresponding receiving holes in the temples by means of a friction fit. In some embodiments, each of the hinges may comprise one or more tab elements substantially corresponding in size and orientation to openings in one or more interior side walls of the receiving holes to selectively secure the temples to the front frame. In some embodiments, each of the hinges may be flexible and spring loaded and may enable the temples to be extended beyond ninety degrees relative to the front frame.

In accordance with embodiments of the present invention, a smartglasses device may comprise a front frame comprising a bridge member connecting a pair of rims having a pair of lenses disposed therein, and a pair of hinge elements. The smartglasses device may further comprise a pair of temples, each having a hinge receiving hole adapted to releasably connect with the hinge elements, the temples further comprising a connectivity module configured to wirelessly connect the temples to a mobile device. In some embodiments, the hinge elements may comprise a substantially round portion and may each extend from a rear side of the front frame. In some embodiments, the hinge elements may connect to the receiving holes by means of a releasable friction fit. In some embodiments, the temples may be configured to releasably fasten or lock to the front frame when the hinge elements are inserted into the receiving holes and the temples are twisted in a first direction to secure the hinge elements to the interior of the receiving holes. In some embodiments, the receiving holes are configured to unfasten or unlock the hinge elements when the temples are twisted ninety degrees in a second direction, opposite the first direction.

The inventions described herein also can be implemented with the voice assistant management inventions marketed by Assignee under the trade name VYRB™, which are described in application Ser. No. 16/829,841, filed Mar. 25, 2020, entitled Voice Assistant Management.

BRIEF DESCRIPTION OF THE DRAWINGS

Accompanying this written specification is a collection of drawings of exemplary embodiments of the present invention. One of ordinary skill in the art would appreciate that these are merely exemplary embodiments, and additional and alternative embodiments may exist and still be within the spirit of the invention as described herein.

FIG. 7 shows a first side view of round-framed smartglasses having flat hinges and the temples detached from the front frame in accordance with an embodiment of the present invention.

FIG. 8 shows a second side view of round-framed smartglasses having flat hinges and the temples detached from the front frame in accordance with an embodiment of the present invention.

DETAILED DESCRIPTION

Figure 1:
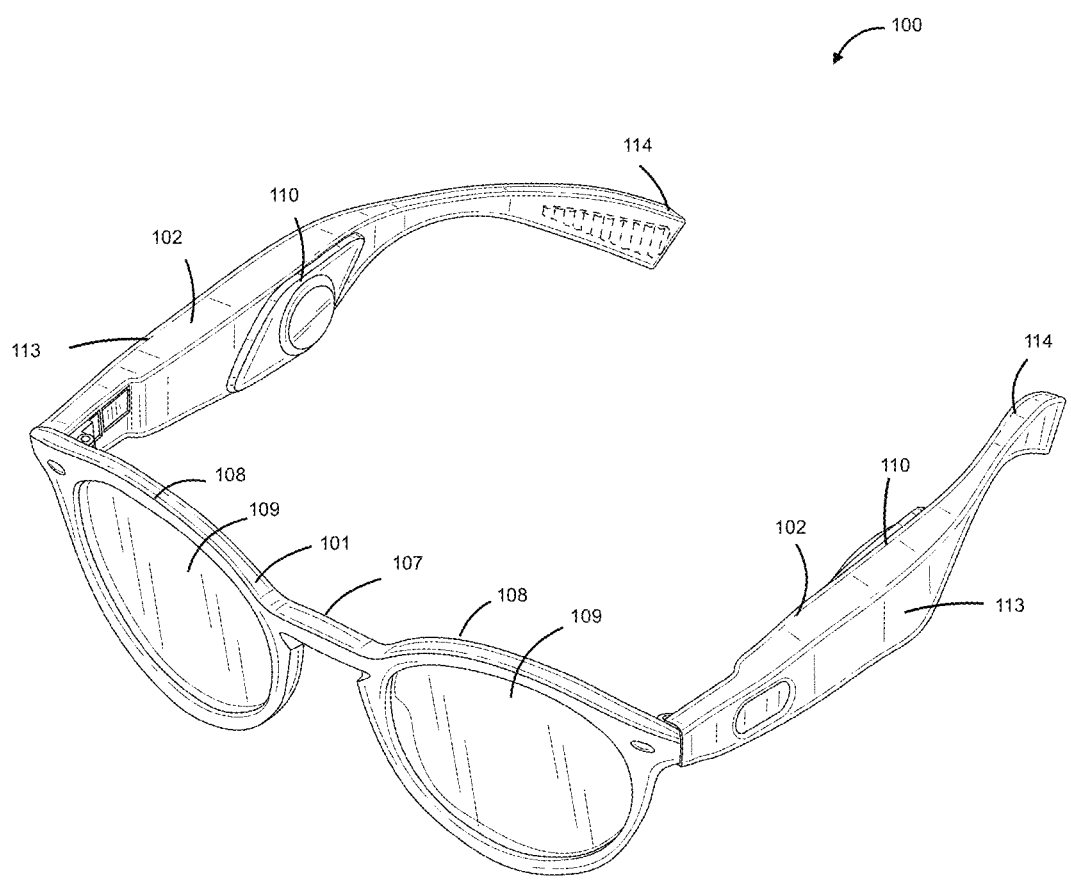
FIG. 1 shows a perspective view of round-framed smartglasses attached to the front frame in accordance with an embodiment of the present invention.

The present invention is generally directed toward electronic glasses having "smart" functionalities, including the ability to connect to a network to share, transmit and interact with other electronics remotely. Specifically, embodiments of the present invention are directed toward electronic glasses which incorporate Bluetooth® or other wireless technologies, including the technologies disclosed in U.S. application Ser. No. 16/022,097 entitled SMARTGLASSES AND METHODS AND SYSTEMS FOR USING ARTIFICIAL INTELLIGENCE TO CONTROL MOBILE DEVICES USED FOR DISPLAYING AND PRESENTING TASKS AND APPLICATIONS AND ENHANCING PRESENTATION AND DISPLAY OF AUGMENTED REALITY INFORMATION, which allow users to transmit and receive communications and data, while also providing users with the flexibility to choose and change the style of the front frame of the device.

In accordance with embodiments of the present invention, a smartglasses device may comprise a removable front frame comprising hinges and rims, the rims comprising lenses, and temples releasably connected to the hinges, wherein the hinges and the temples connect by a friction fit and at least one of the temples comprise electronics components configured and programmed to transmit and receive electronic signals.

In accordance with embodiments of the present invention, at least one of the temples may comprise a printed circuit board, memory, battery, camera, microphone, speakers, connectivity module, cellular communications unit and hardware, and artificial intelligence interface in electronic communication, the connectivity module and the cellular communications unit and hardware configured and programmed to pair or connect the smartglasses to a smartphone, smartwatch, or other devices or systems and support active priority for the smartphone, the smartwatch, or the other device or systems, the smartglasses configured and programmed to receive oral requests or commands at the microphone and artificial intelligence interface to perform mobile device tasks or applications and process and communicate the oral requests or commands to a mobile device application controlling paired or connected devices or systems used for display or presentation of information related to the requested or commanded tasks or applications, the mobile device application and the artificial intelligence interface are programmed or configured to control paired or connected devices used for display or presentation of information related to requested or commanded tasks or applications and to display or present information related to the requested or commanded tasks or applications on the smartglasses, a paired or connected smartwatch, smartphone, or other paired or connected devices or systems, based on default settings, and to activate connections between the paired or connected smartglasses, smartphone, the smartwatch or additional devices or systems having higher priority until a capacity for connection with the smartglasses, the smartphone, the smartwatch, or other paired or connected devices or systems is reached, and receive at the microphone oral commands to override or switch the default settings and display or present information on a paired or connected device as specified in the override or switch commands at the microphone and artificial intelligence and process and communicate the oral requests or commands to the mobile device application controlling paired or connected devices used for display or presentation of information related to requested or commanded tasks or applications switch display from a mobile device specified in the default settings to the paired or connected device or devices specified in the switch or override command.

In accordance with embodiments of the present invention, the smartglasses device may be controlled by a smartglasses mobile application, wherein the mobile device application controlling paired or connected devices used for display or presentation of information related to requested or commanded tasks or applications is the smartglasses mobile application.

In accordance with embodiments of the present invention, the front frame may contain no electrical wiring that connects to the temples. Moreover, the front frame may be configured to be removed from each of the temples and replaced without affecting any electronic connection between the temples and the front frame and any devices or systems paired or connected to the temples of the smartglasses.

In accordance with embodiments of the present invention, the hinges may each comprise an insert component having a first end pivotally connected to the front frame and a second end adapted to releasably connect with the temple receiving holes. In some embodiments, the insert components may be substantially flat. In some embodiments, the insert components may further comprise one or more tab elements substantially corresponding in size and orientation to openings in one or more interior side walls of the receiving holes to selectively secure the temples to the front frame.

In accordance with embodiments of the present invention, the hinges may be pivot hinges having rounded profiles that releasably connect to the temples at receiving holes of corresponding size in the temples.

In accordance with embodiments of the present invention, a smartglasses device may comprise a front frame comprising a bridge member connecting a pair of rims having a pair of lenses disposed therein, and a pair of hinge elements each comprising an insert component having a first end opposite a second end, with the first end pivotally connected to the front frame, and a pair of temples, each having a hinge receiving hole adapted to releasably connect with the second end of the insert component, at least one of the temples further comprising a connectivity module configured to wirelessly connect the temples to a mobile device. In some embodiments, the insert components may be substantially flat and may releasably connect to corresponding receiving holes in the temples by means of a friction fit. In some embodiments, each of the hinges may comprise one or more tab elements substantially corresponding in size and orientation to openings in one or more interior side walls of the receiving holes to selectively secure the temples to the front frame. In some embodiments, each of the hinges may be flexible and spring loaded and may enable the temples to be extended beyond ninety degrees relative to the front frame.

In accordance with embodiments of the present invention, a smartglasses device may comprise a front frame comprising a bridge member connecting a pair of rims having a pair of lenses disposed therein, and a pair of hinge elements. The smartglasses device may further comprise a pair of temples, each having a hinge receiving hole adapted to releasably connect with the second end of the insert component, the temples further comprising a connectivity module configured to wirelessly connect the temples to a mobile device. In some embodiments, the hinge elements may each extend from a rear side of the front frame and comprise a substantially round portion. In some embodiments, the hinge elements may connect to the receiving holes by means of a releasable friction fit. In some embodiments, the temples may be configured to releasably fasten or lock to the front frame when the hinge elements are inserted into the receiving holes and the temples are twisted in a first direction to secure the pivot hinges to the interior of the receiving holes. In some embodiments, the receiving holes are configured to unfasten or unlock the hinge elements when the temples are twisted ninety degrees in a second direction, opposite the first direction.

Turning now to the figures, FIGS. 1-29 demonstrate exemplary embodiments of the present invention wherein the quick connect smartglasses 100 may comprise a front frame member 101 releasably connected to a pair of temples 102, one or both of which may be configured with wireless communication and audio transmission technology.

Figure 2:
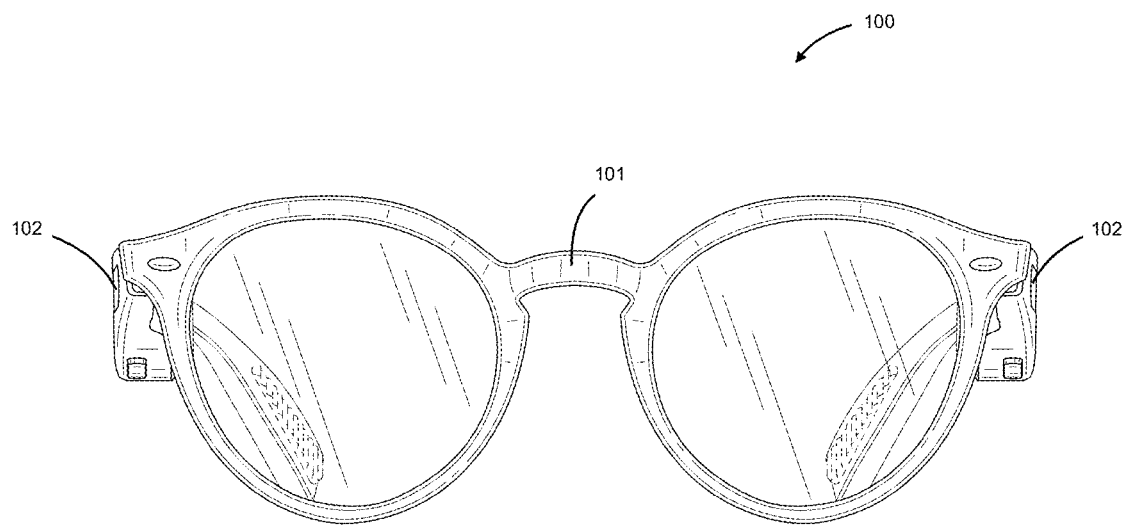
FIG. 2 shows a front view of round-framed smartglasses attached to the front frame in accordance with an embodiment of the present invention.
Figure 3:
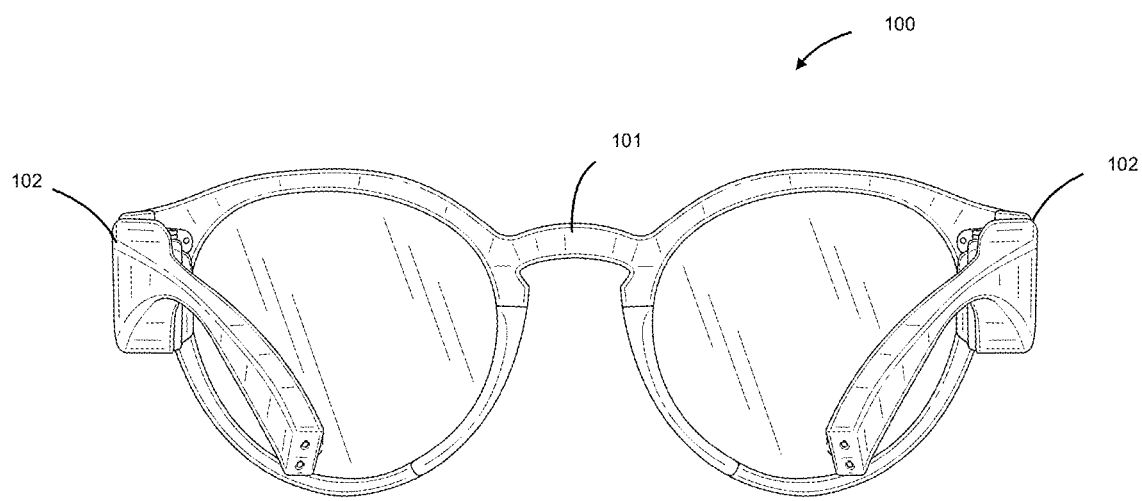
FIG. 3 shows a rear view of round-framed smartglasses attached to the front frame in accordance with an embodiment of the present invention.
Figure 4:
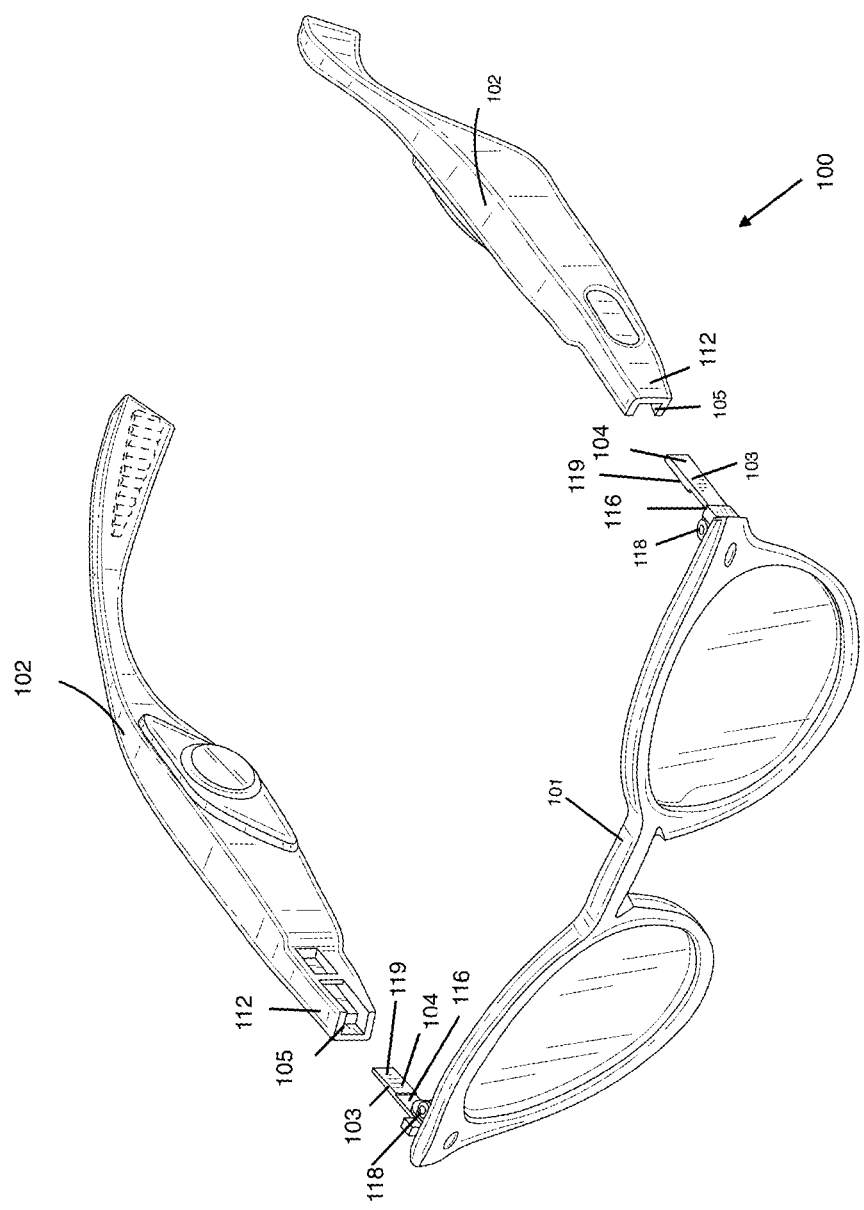
FIG. 4 shows a perspective view of round-framed smartglasses having flat hinges and the temples detached from the front frame in accordance with an embodiment of the present invention.
Figure 5:
FIG. 5 shows a front view of glasses temples configured to receive flat hinges in accordance with an embodiment of the present invention.
Figure 6:
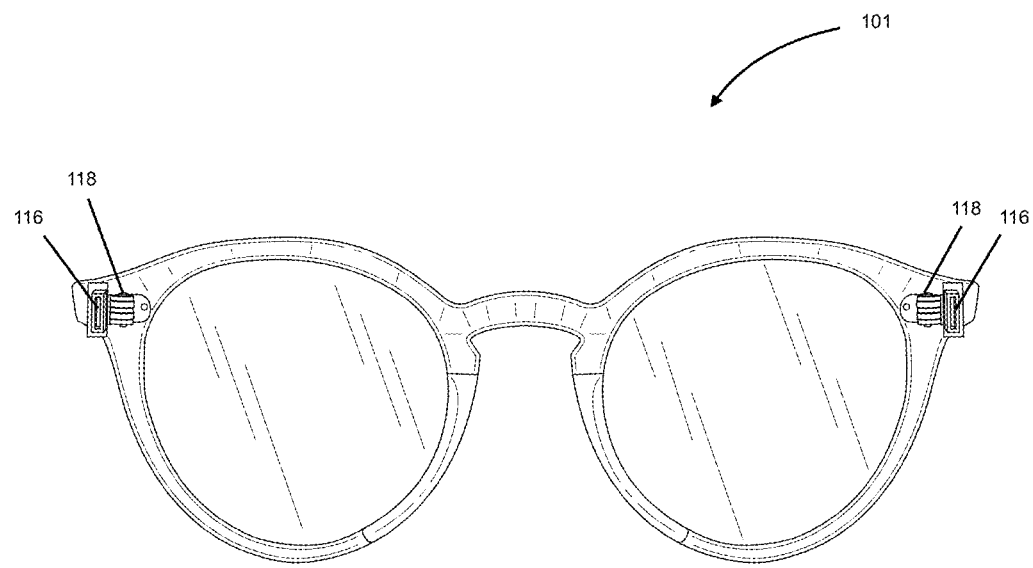
FIG. 6 shows a rear view of round-framed front frames having flat connector hinges in accordance with an embodiment of the present invention.
Figure 9:
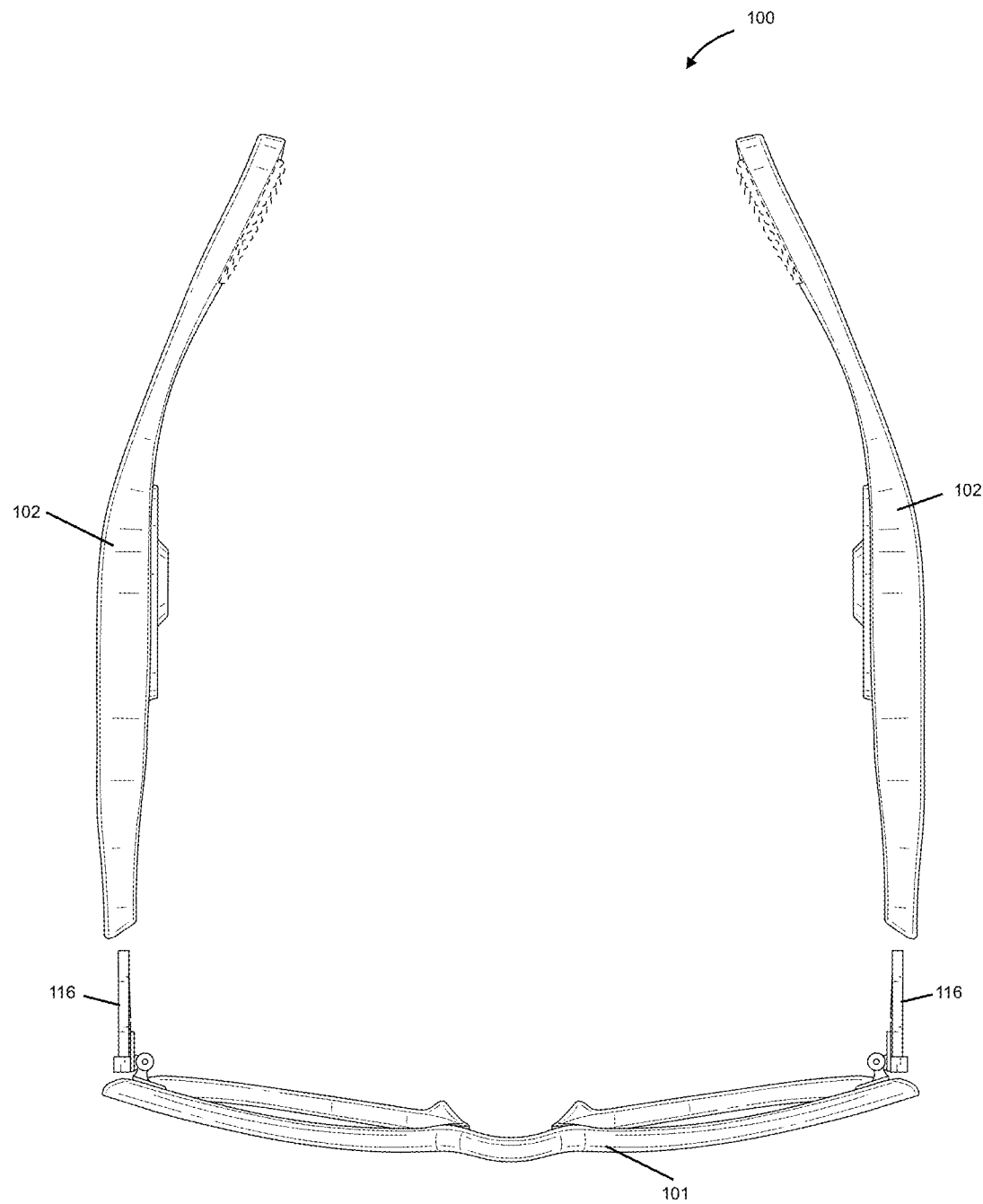
FIG. 9 shows a top view of round-framed smartglasses having flat hinges and the temples detached from the front frame in accordance with an embodiment of the present invention.
Figure 10:
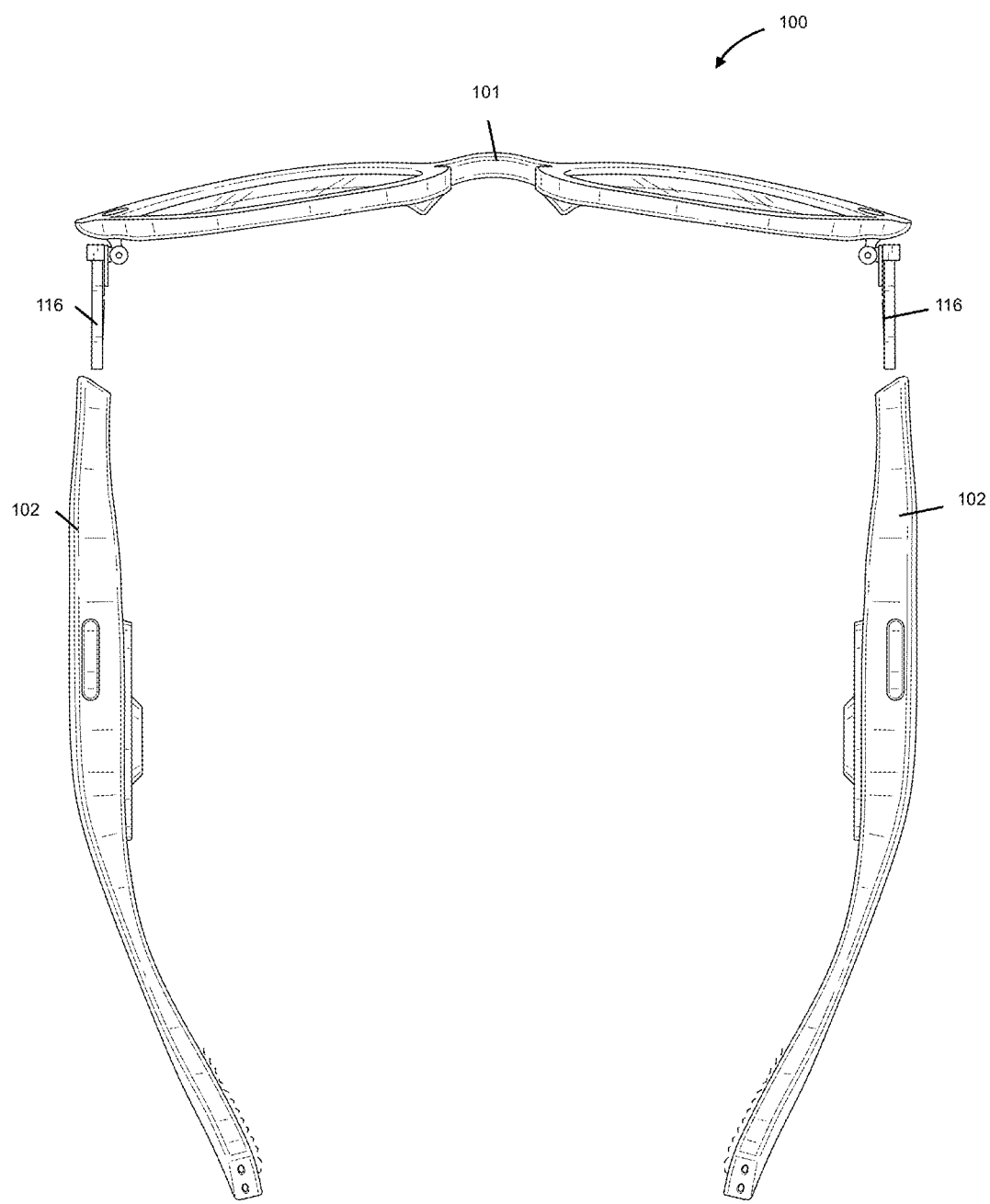
FIG. 10 shows a bottom view of round-framed smartglasses having flat hinges and the temples detached from the front frame in accordance with an embodiment of the present invention.
Figure 11:
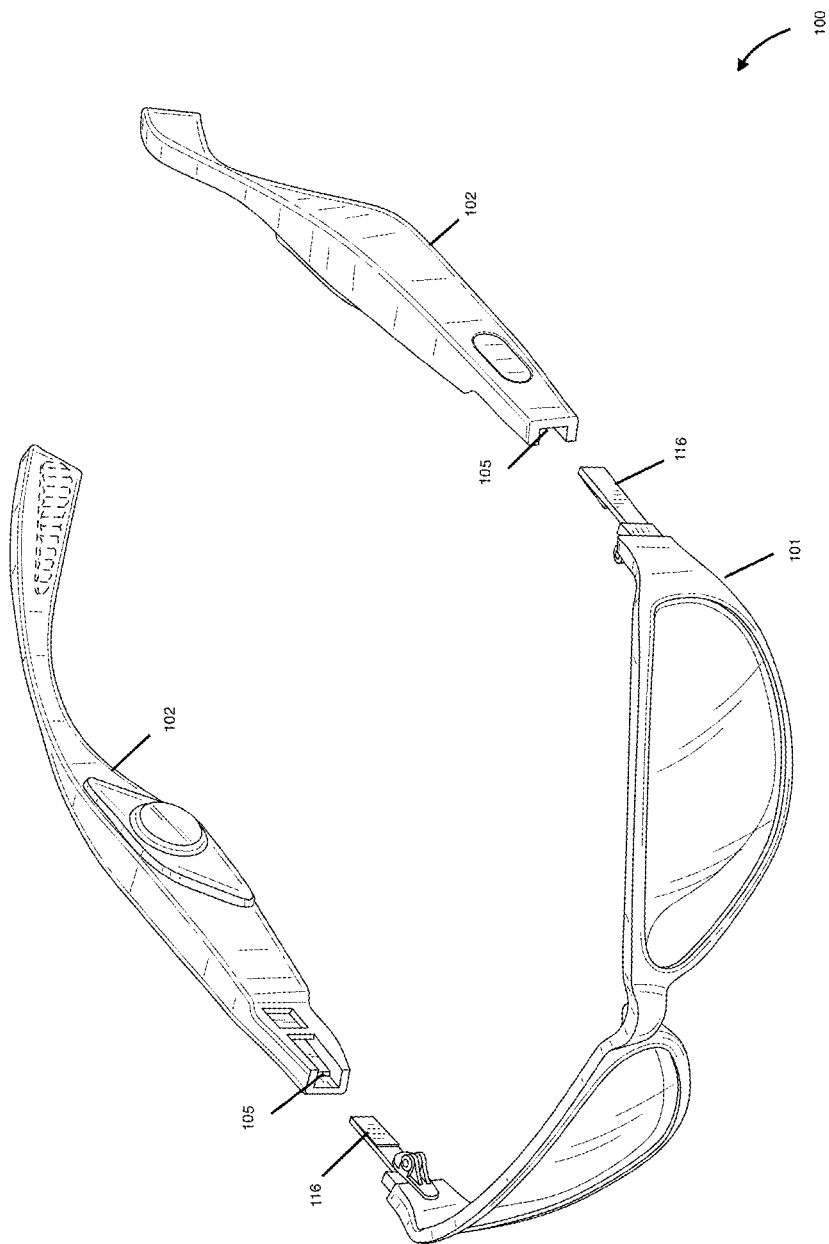
FIG. 11 shows a perspective view of sport smartglasses having flat hinges and the temples detached from the front frame in accordance with an embodiment of the present invention.
Figure 12:
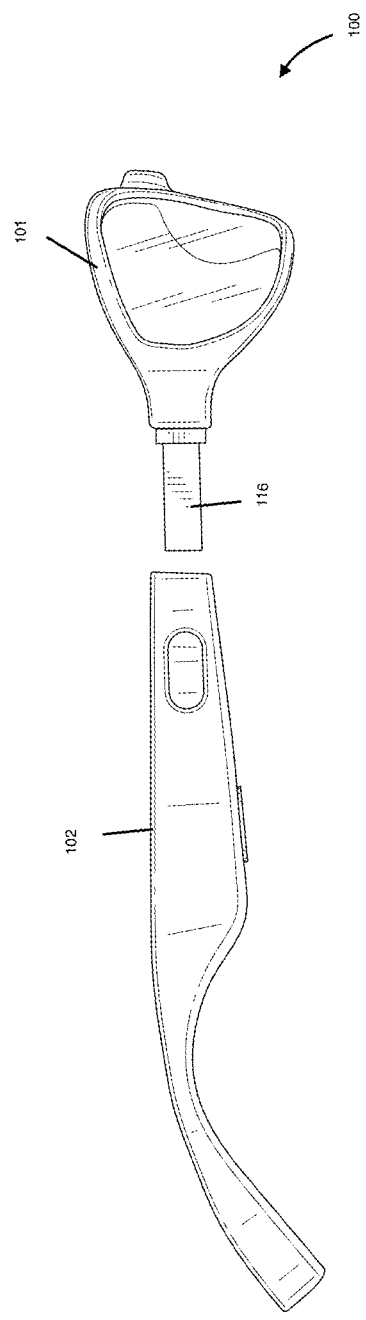
FIG. 12 shows a first side view of sport smartglasses having flat hinges and the temples detached from the front frame in accordance with an embodiment of the present invention.
Figure 13:
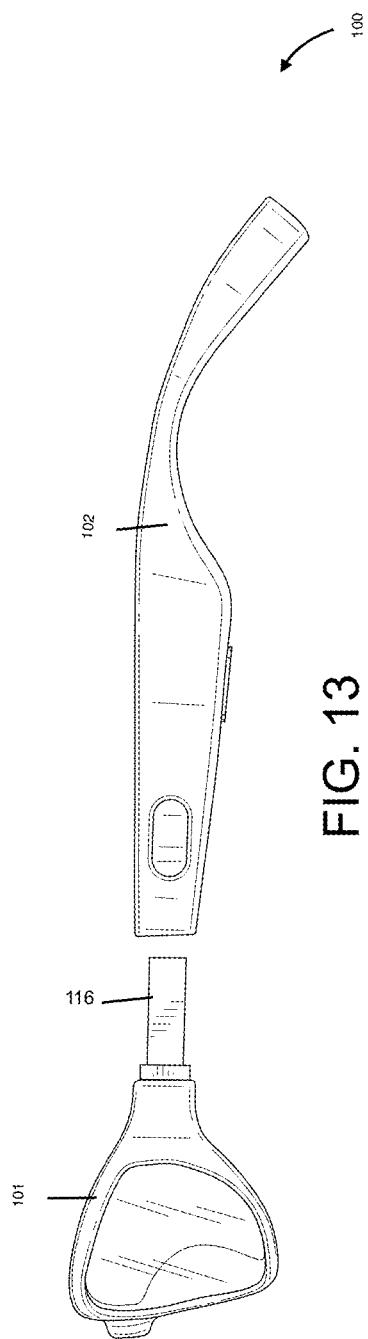
FIG. 13 shows a second side view of sport smartglasses having flat hinges and the temples detached from the front frame in accordance with an embodiment of the present invention.
Figure 14:
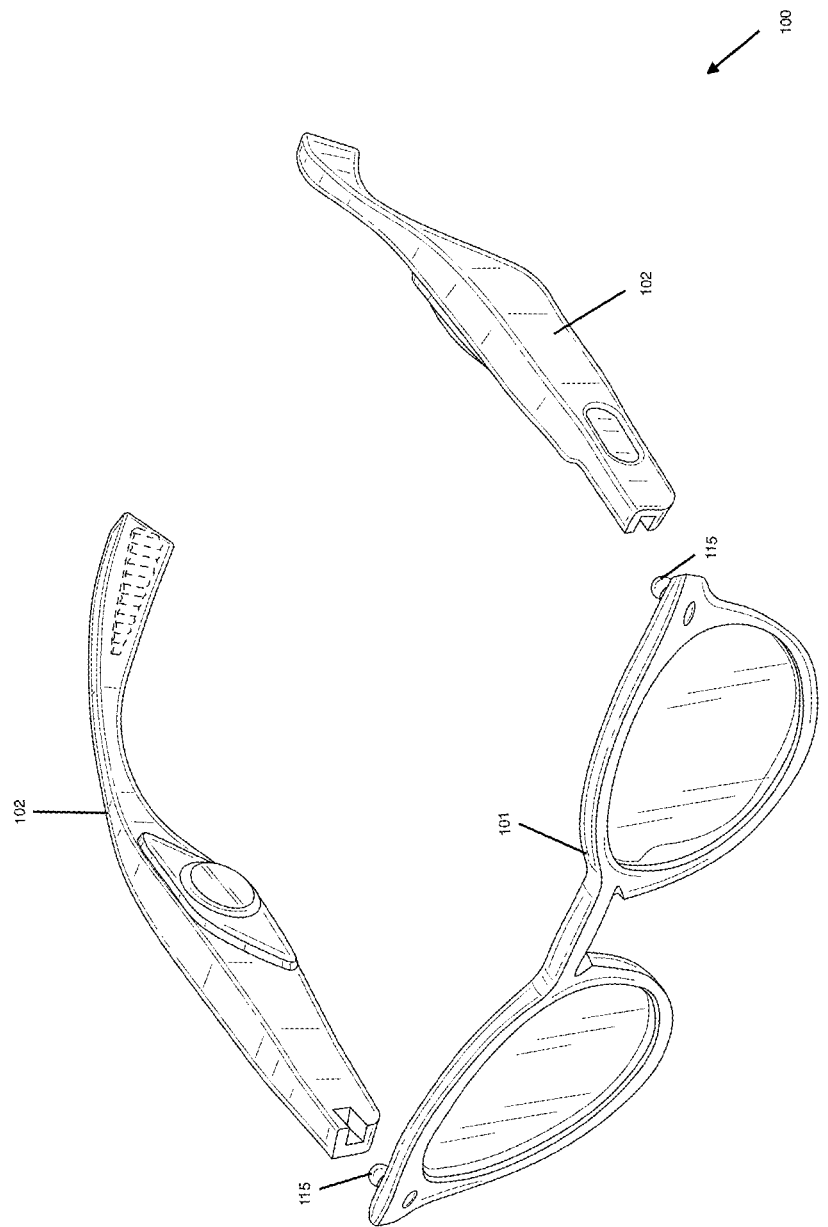
FIG. 14 shows a perspective view of round-framed smartglasses having pivot hinges and the temples detached from the front frame in accordance with an embodiment of the present invention.
Figure 15:
FIG. 15 shows a front view of glasses temples configured to receive pivot hinges in accordance with an embodiment of the present invention.
Figure 16:
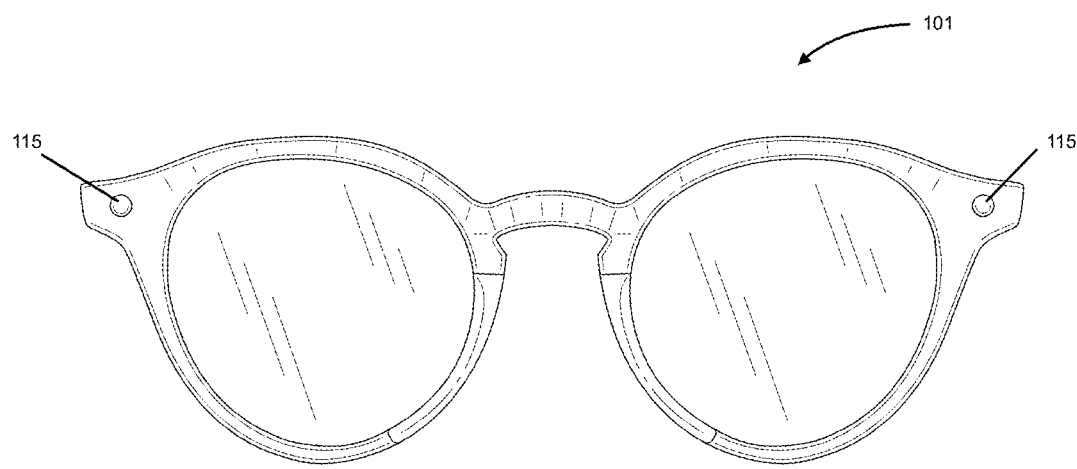
FIG. 16 shows a rear view of round-framed front frames having pivot hinges in accordance with an embodiment of the present invention.
Figure 17:
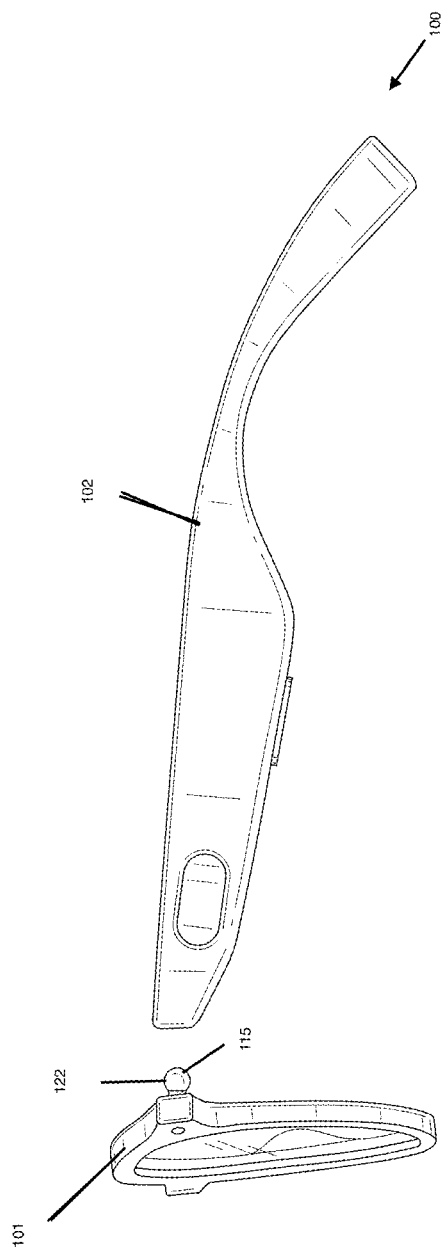
FIG. 17 shows a first side view of round-framed smartglasses having pivot hinges and the temples detached from the front frame in accordance with an embodiment of the present invention.
Figure 18:
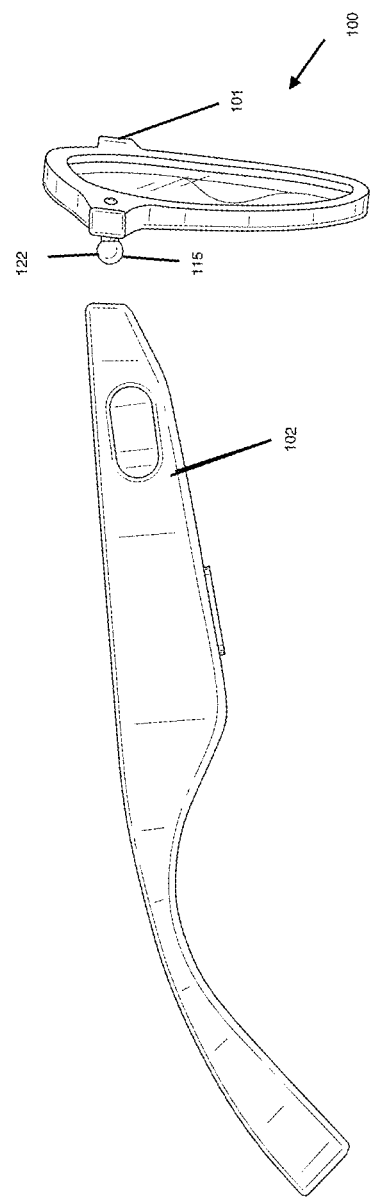
FIG. 18 shows a second side view of round-framed smartglasses having pivot hinges and the temples detached from the front frame in accordance with an embodiment of the present invention.
Figure 19:
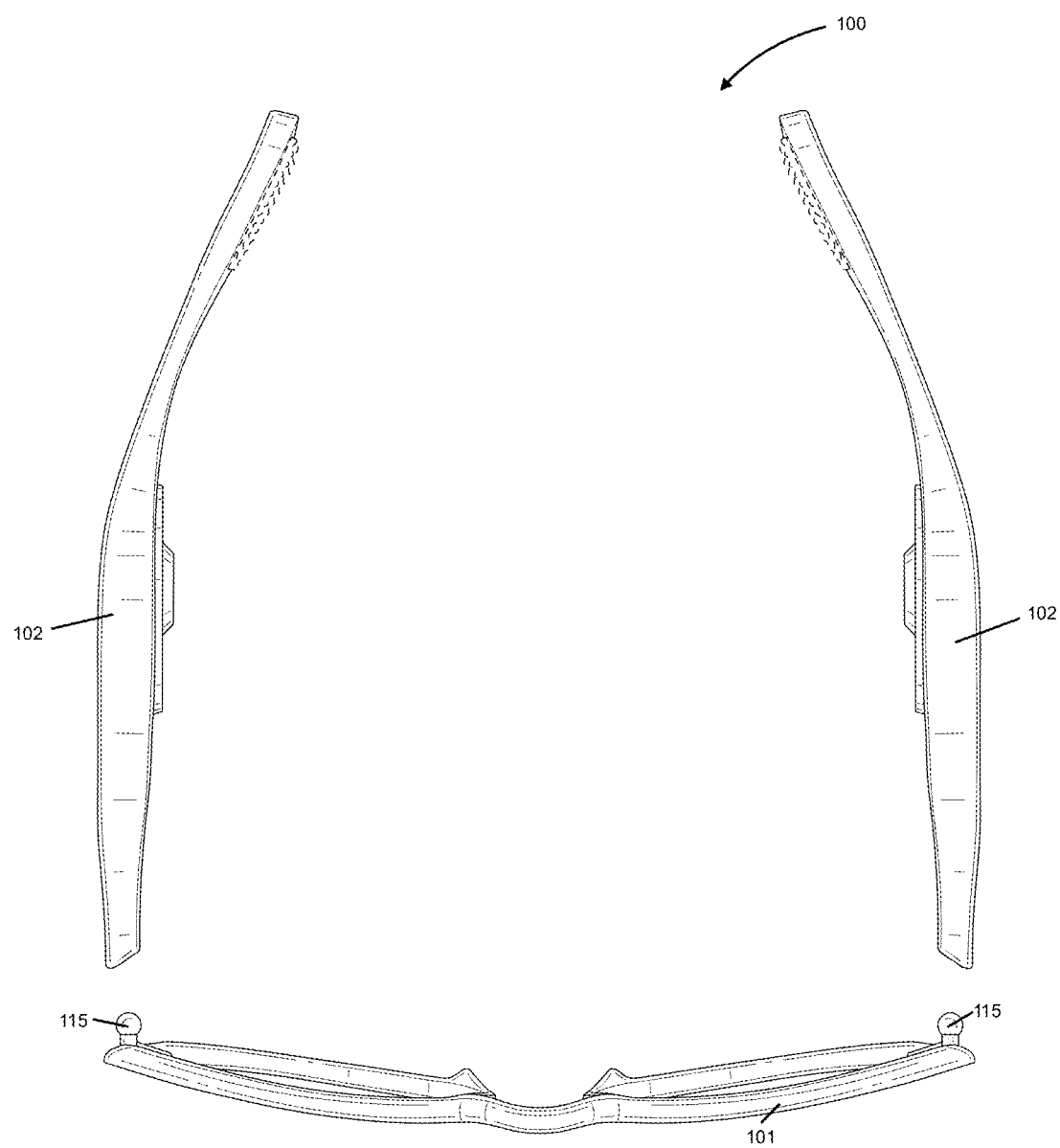
FIG. 19 shows a top view of round-framed smartglasses having pivot hinges and the temples detached from the front frame in accordance with an embodiment of the present invention.
Figure 20:
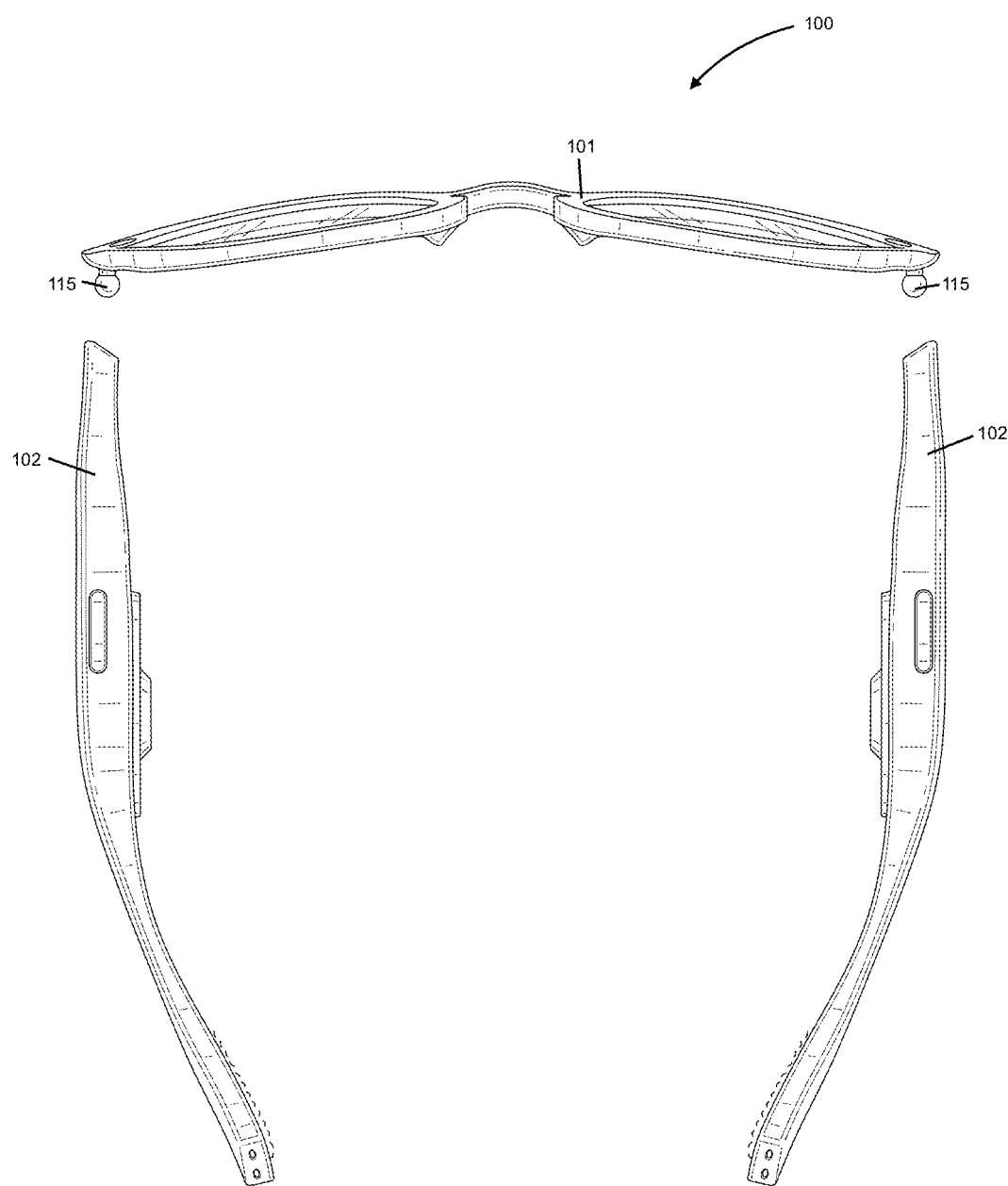
FIG. 20 shows a bottom view of round-framed smartglasses having pivot hinges and the temples detached from the front frame in accordance with an embodiment of the present invention.
Figure 21:
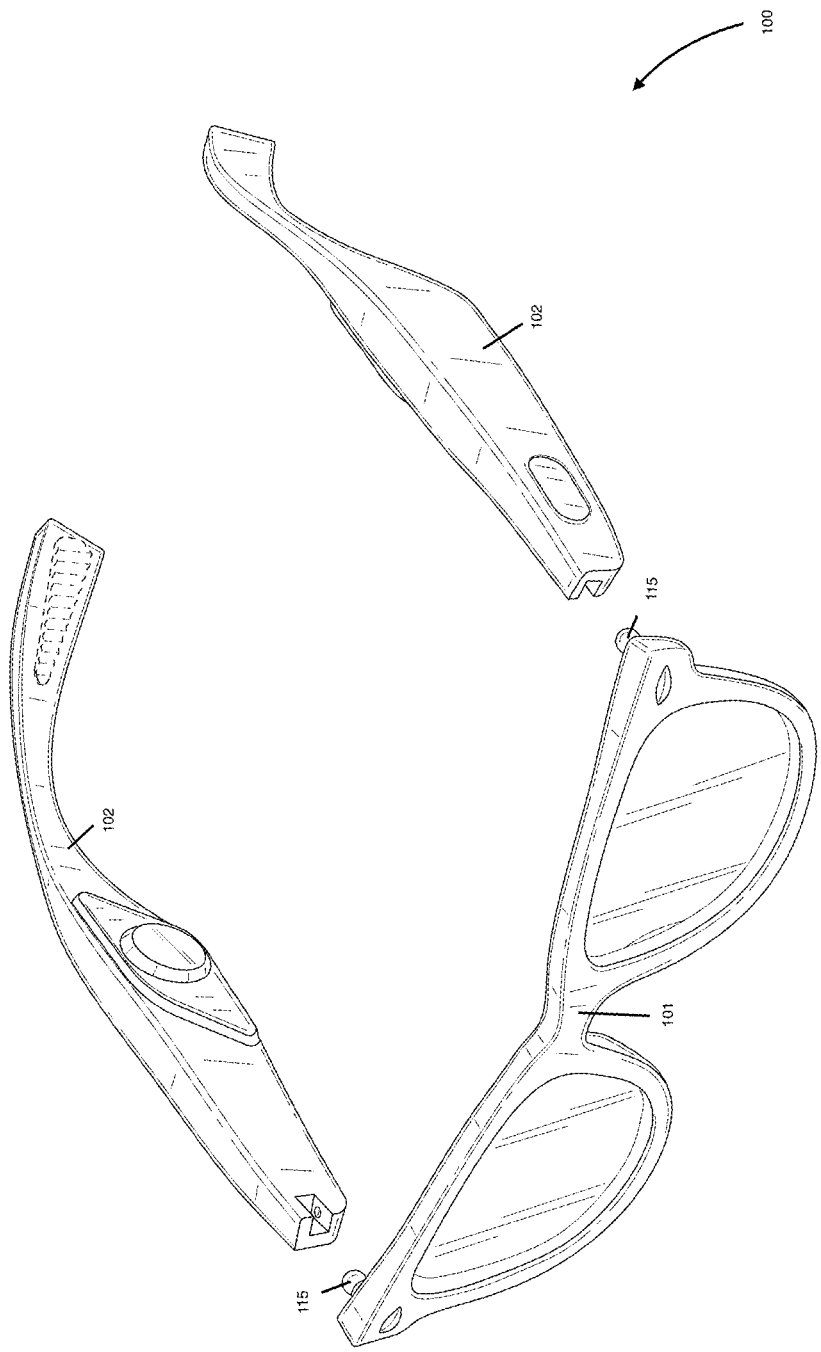
FIG. 21 shows a perspective view of wayfarer smartglasses having pivot hinges and the temples detached from the front frame in accordance with an embodiment of the present invention.
Figure 22:
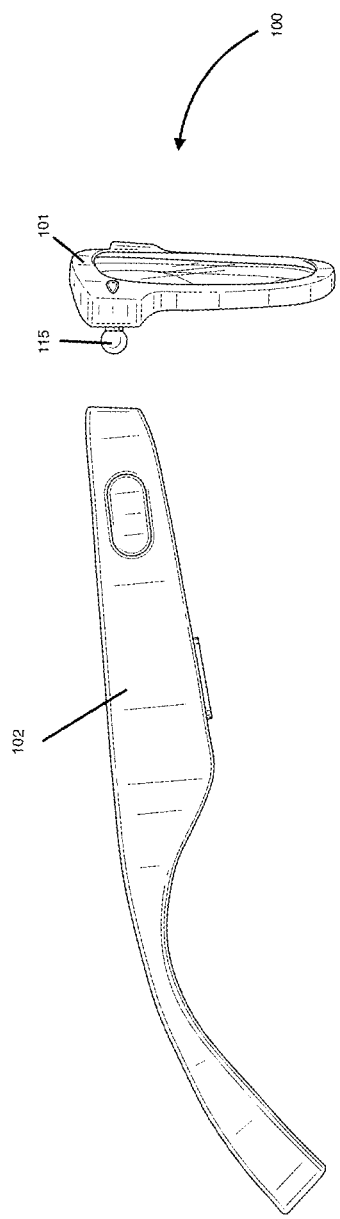
FIG. 22 shows a first side view of wayfarer smartglasses having pivot hinges and the temples detached from the front frame in accordance with an embodiment of the present invention.
Figure 23:
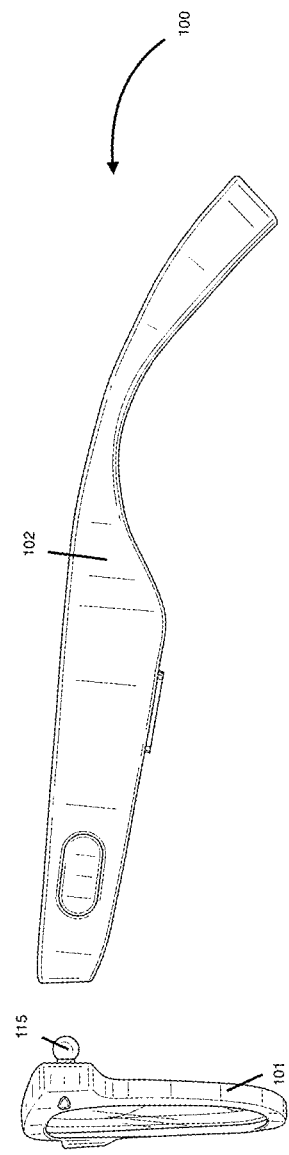
FIG. 23 shows a second side view of wayfarer smartglasses having pivot hinges and the temples detached from the front frame in accordance with an embodiment of the present invention.

FIGS. 1-10 demonstrate multiple views of round-framed smartglasses having flat hinges and temples in accordance with embodiments of the present invention. Specifically, FIGS. 1-3 depict the glasses 100, where the temples 102 are connected to the front frames 101 and FIGS. 4-10 depict the glasses 100, where the temples 102 are detached or disconnected from the front frames 101. While the front frame member depicted in FIGS. 1-10 is round-framed, other shapes, colors, and styles could be used. In the depicted embodiment, the glasses 100 comprise a front frame member 101 releasably engageable with a pair of temples 102. In the illustrated example, the front frame member 101 comprises a bridge 107 and rims 108 adapted to receive lenses 109.

The temples 102 of the glasses 100 may include wireless technology, for example, Bluetooth® technology for connecting the glasses to a mobile phone, tablet, or other smart device in order to permit the transmission or playing of music and other audio by the glasses 100. In some embodiments, the temples 102 include a microphone (not shown), battery (not shown), bone conduction speakers 110, one or more printed circuit boards (not shown), a control pad (not shown), a connectivity module and hardware (not shown), and a cellular communications unit and hardware (not shown) which may be configured to enable the glasses 100 to communicate over a wireless network, for example, Bluetooth® wireless networks, cellular wireless networks, WiFi, near field communication and/or other types of wireless technology standards to pair and/or communicate with other electronic devices, for example, mobile devices including smartphones and smartwatches. In some embodiments, other components which are not depicted in the exemplary embodiments disclosed herein, may be incorporated into the smartglasses 100.

In some embodiments, each of the temples 102 include an end piece connector element 112, a housing section 113 configured as an electronics housing, and a temple tip 114. In some embodiments, a substantial portion of the electronics components are generally disposed within the temple housing section 113. In some embodiments, the end piece connector elements 112 may comprise receiving holes 105 configured to receive and engage with at least a portion of the joints 103 disposed on front frame member 101.

In accordance with some embodiments of the present invention, a pair of hinge elements or joints 103 may be disposed on a rear side of the front frame member 101. The joints 103 may be configured to reversibly connect to end piece connector elements 112, disposed at the end of the temples 102. In any embodiment, the end piece connector elements 112 and the joints 103 may be configured to releasably connect, to enable selective connection of a selected front frame member 101 to a pair of temples 102.

Note, that although there are embodiments described herein where the speakers are bone conduction speakers, alternative types of speakers can be used, such as depicted in FIGS. 26-29, where the speakers are vibrating transducer speakers 111. Note there would preferably be a second vibrating transducer speaker in the second temple to correspond to vibrating transducer speaker 111 and slit 111a depicted in FIGS. 26 and 27. The slit 111a used for the vibrating transducer speaker 111 contributes to a reduction in the weight of the smartglasses and makes the smartglasses more comfortable for extended wear. Note also that any of the different types of hinges and hinge elements described herein, as shown in FIGS. 26-29, can be used interchangeably with any of the variations of temples described herein, both with and without bone conduction speakers, memory, and a camera.

As shown in FIGS. 4-13, 27, and 28, in some embodiments, the joints 103 may be configured as flat hinges 116. In some embodiments, the flat hinges 116 may be flexible hinges. In some embodiments, the flat hinges 116 may include pins or screws 118 configured to permit the articulation of the flat hinges 116. In some embodiments, a first side of the flexible hinge 116 may articulate independently from a second side of the flexible hinge 116. In some embodiments, a first side of each of the flat hinges 116 may be connected to the front frame member 102 and a second side of each of the flat hinges 116 may be configured with an insert component or connector post 104. In some embodiments, the connector posts 104 may be configured to reversibly engage with a receiving hole 105 disposed on each of the temples 102. In some embodiments, the connector posts 104 may be configured to friction fit within the receiving holes 105 disposed on the end piece connector elements 112. In some embodiments, the connector posts 104 may comprise one or more tab elements 119 which may substantially correspond in size, shape and/or orientation to openings in one or more side walls of the receiving holes 105 of the temples 102 to selectively secure the temples 102 to the front frame member 101. In the depicted example, each of the connector posts 104 include an actuator release button 106. In some embodiments, the actuator release button 106 is configured to prompt the attachment and/or removal of the temples 102 from the front frame member 101.

Alternatively, in some embodiments, a connector post 104 may be disposed on each of the temples 102 and may be configured to friction fit into receiving holes formed in each of the flat hinges 116 disposed on the front frame member 101.

As shown in FIGS. 14-23, 26, and 28 in some embodiments, the joints 103 may be configured as pivot hinges 115. In some embodiments, the pivot hinges 115 may be integrally formed with the front frame member 101. In some embodiments, the pivot hinges 115 have round profiles 122 and are configured to engage with the end piece connector elements 112 to create a releasable friction fit between the round profiles 122 and the receiving holes 105. For example, the pivot hinges 115 may be adapted to be inserted into the receiving holes 105 to reversibly fasten the temples 102 to the front frame member 101. In some examples, the pivot hinges 115 are configured to friction fit into the receiving holes 105 disposed on the end piece connector elements 112. In some embodiments, the temples 102 are configured to releasably fasten or lock to the front frame member 101 when the pivot hinges 115 are inserted into the receiving holes 105, and the temples 102 are twisted in a first direction to secure the pivot hinges 115 to the interior of the receiving holes 105, and to unfasten or unlock when the temples 102 are twisted ninety degrees in a second direction, opposite the first direction, and the receiving holes 105 such that the receiving holes 105 may release their hold of the pivot hinges 115. For example, the temples 102 may be twisted ninety degrees to the right to secure the pivot hinges 115 to the interior of the receiving holes 105, and may be twisted ninety degrees to the left to unfasten or unlock the temples 102 from the receiving holes 105 such that the receiving holes 105 may release their hold of the pivot hinges 115. In some examples, the temples 102 may be twisted ninety degrees to the left to secure the pivot hinges 115 to the interior of the receiving holes 105, and may be twisted ninety degrees to the right to unfasten or unlock the temples 102 from the receiving holes 105 such that the receiving holes 105 may release their hold of the pivot hinges 115.

Alternatively, in some embodiments, the pivot hinges 115 may be disposed on the temples 102 and may be configured to friction fit into receiving holes formed in the joints 103 in the front frame member 101.

Figure 24:
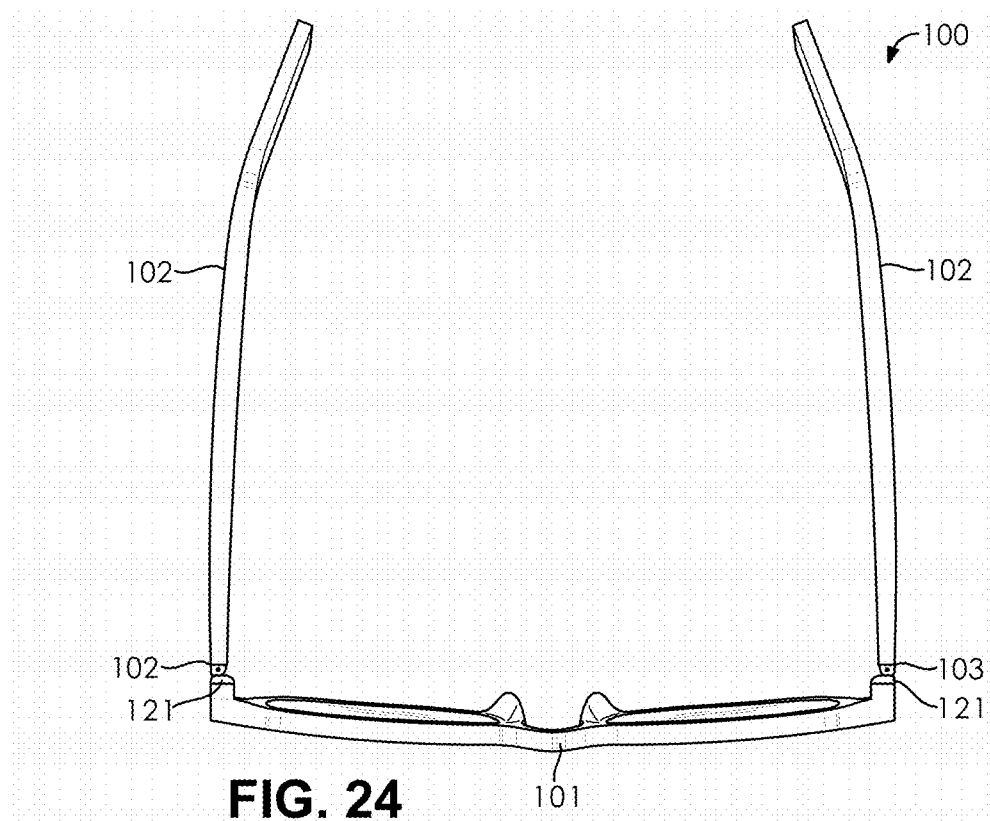
FIG. 24 shows a top view of exemplary smartglasses having flexible, spring-loaded hinges in accordance with an embodiment of the present invention.
Figure 25:
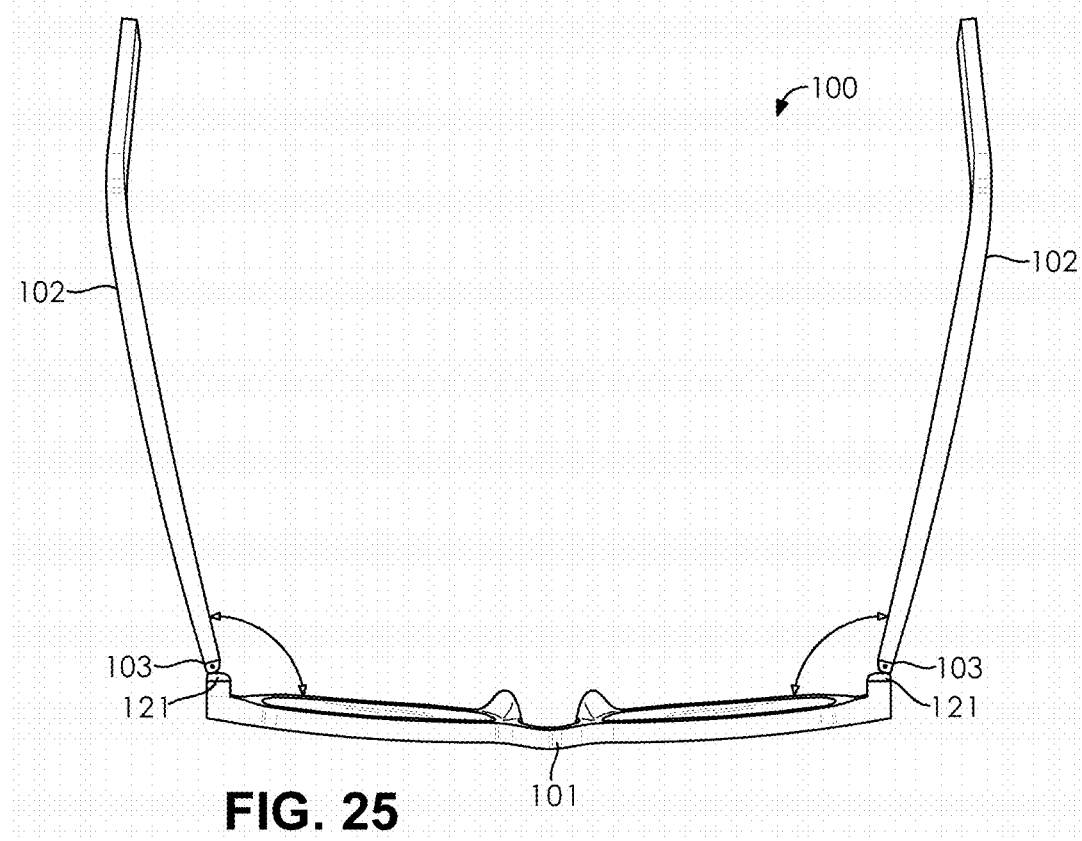
FIG. 25 shows an additional top view of exemplary smartglasses having flexible, spring-loaded hinges in accordance with an embodiment of the present invention.
Figure 26:
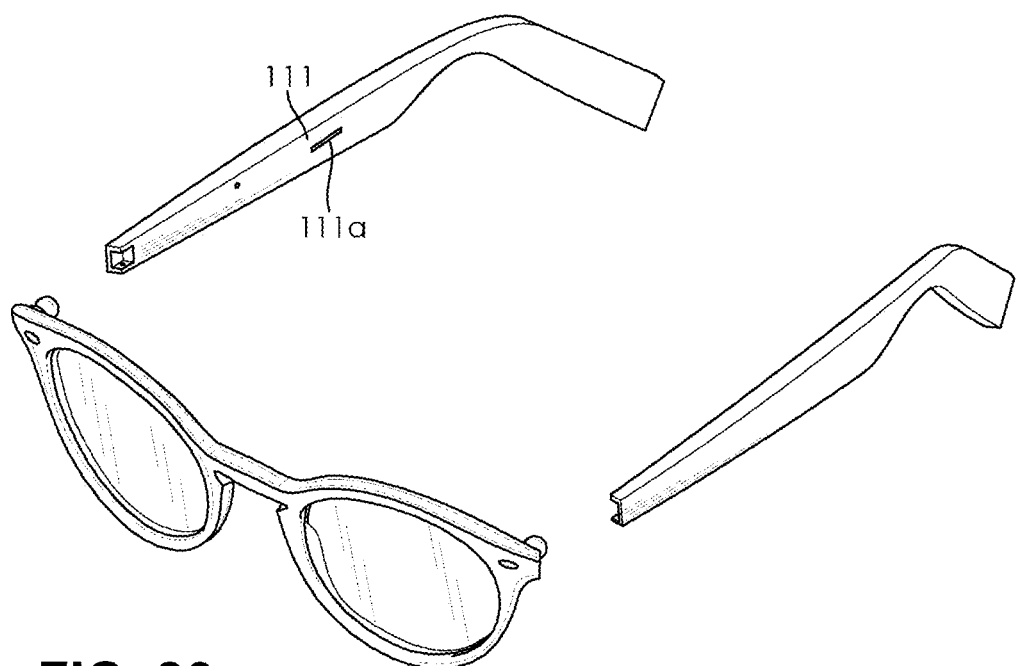
FIG. 26 shows a perspective view of round-framed smartglasses having exemplary pivot hinges and the temples detached from the front frame in accordance with an embodiment of the present invention, where the speakers are vibrating transducer speakers.
Figure 27:
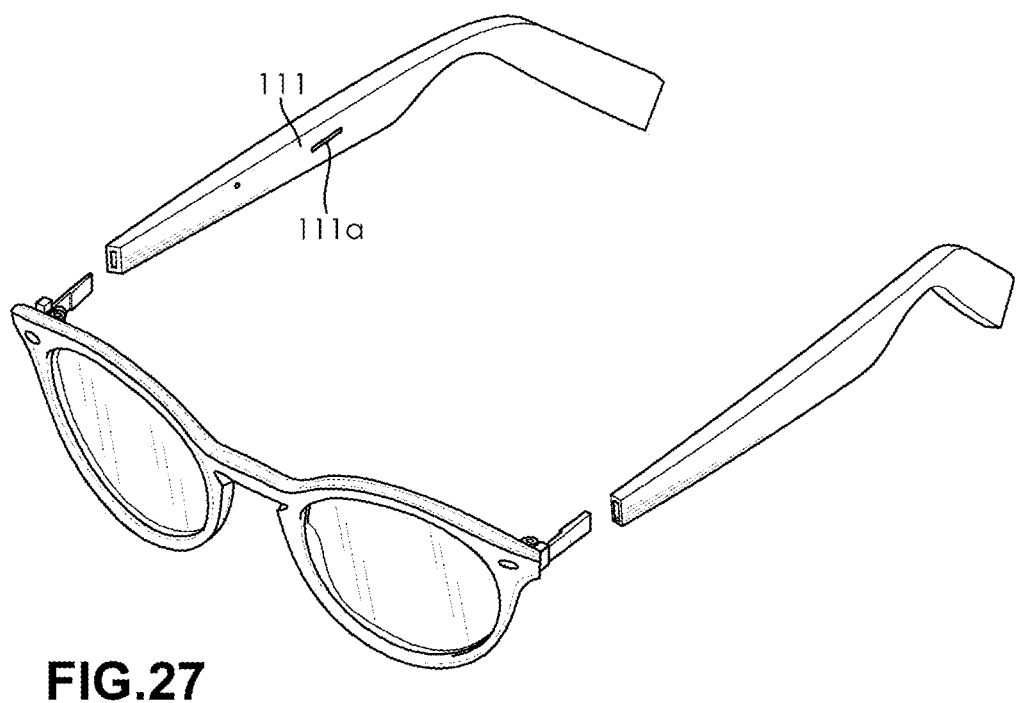
FIG. 27 shows a perspective view of round-framed smartglasses having flat hinges with the temples detached from the front frame in accordance with an embodiment of the present invention, where the speakers are vibrating transducer speakers.
Figure 28:
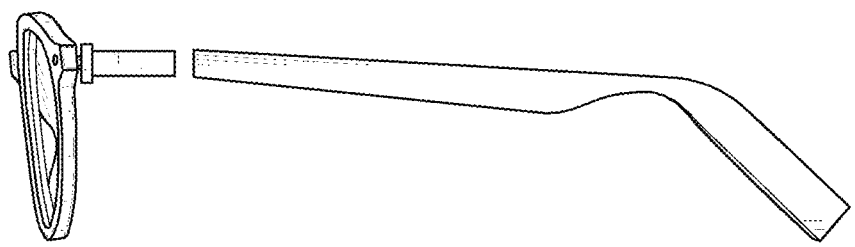
FIG. 28 shows a first side view of round-framed smartglasses having flat hinges with the temples detached from the front frame in accordance with an embodiment of the present invention, where the speakers are vibrating transducer speakers.
Figure 29:
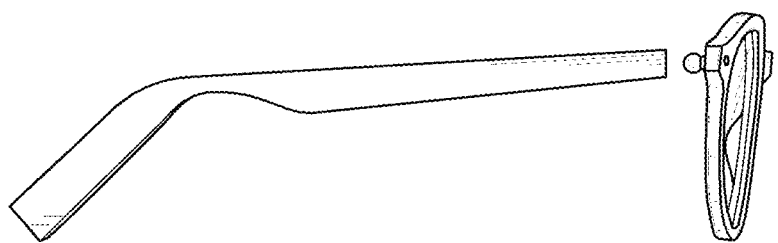
FIG. 29 shows a second side view of round-framed smartglasses having pivot hinges with the temples detached from the front frame in accordance with an embodiment of the present invention, where the speakers are vibrating transducer speakers.

As shown in FIGS. 24-25, in some embodiments, the joints 103 may be configured as flexible, spring loaded hinges 121 that enable the temples 102 of the glasses 100 to be extended beyond ninety degrees relative to the front frame member 101. For example, the temples 102 may be configured to connect to the front frame 101 via flexible, spring loaded hinges 121, to enable the temples 102 of the glasses 100 to be extended beyond ninety degrees relative to the front frame member 101.

In accordance with various embodiments of the present invention, the liberation of the front frame member 101 from the wireless-technology enabled temples 102 may enable users to selectively change the front design or style of their glasses, without having to purchase a whole new device or pair of glasses. For example, a user may buy a first pair of glasses having a first pair of temples 102 and a first front frame member design, as shown in FIGS. 1-10. Should the user decide to update the style or design of their glasses, the user is able to easily disconnect the first frame member 101, for example, the round-framed glasses shown in FIGS. 1-10, from the temples 102 and connect a second front frame member, for example, the sport glasses 101 shown in FIGS. 11-13, to the temples 102. Similarly, should the user decide to update or choose to change the type of glasses the user would like to wear, for example, to change between reading glasses and sunglasses, the user would be able to easily disconnect the first frame member 101, for example, reading glasses, from the temples 102 and connect a second front frame member, for example, sunglasses, to the temples 102. In this manner, a user may own a plurality of different front frame members 101 and selectively change the style of their glasses, without having to purchase a whole new pair of glasses.

In accordance with several embodiments of the present invention, the disclosed device may provide a means for quickly and efficiently updating the design or style of a pair of glasses by providing the ability to easily connect and disconnect wireless temples 102 from one or more front frame members 101. In some embodiments, the end piece connector elements 112 may be configured to reversibly lock the temples 102 to a connector post of the flat hinges 116.

In accordance with several embodiments of the present invention, the front frame member 101 may be configured to disconnect from the temples 102 without requiring the disconnection of any electronic wires.

In accordance with several embodiments of the present invention, the wireless communication technology of the glasses device 100 may be configured to function whether or not the temples 102 are connected to a front frame member 101. For example, the glasses 100 may be configured such that disconnecting the temples 102 from the front frame member 101 does not disrupt the electronic connection between each of the temples 102. Also for example, the glasses may be configured such that disconnecting the temples 102 from the front frame member 101 does not disrupt the connection between the temples 102 and a mobile device, for example, a smart device, to which it may be wirelessly connected.

In accordance with several embodiments of the present invention, the front frame member 101 may be glasses with or without outer rims.

In accordance with several embodiments of the present invention, the glasses device 100 disclosed herein provides users with flexibility by providing a means to replace or exchange front frames, without having to exchange the costlier hardware of the temples 102.

In accordance with several embodiments of the present invention, the glasses device 100 disclosed herein may require less material than traditional wireless communication equipped glasses, as a user may simply acquire a variety of front frame members 101 to use with the same or originally purchased temples 102.

In some embodiments of the present invention, users may be able to purchase a first glasses set or a first set of temples 102 and may choose to acquire additional front frame members 101 to optionally change the style, design or function (i.e. front frames having reading lenses or sun protection lenses) of their device simply by replacing a first front frame member with a second front frame member.

In accordance with embodiments of the present invention, the temples 102 of the glasses 100 can include wireless technology, for example, Bluetooth® technology for connecting the glasses to a mobile phone, tablet, or other smart device in order to permit the transmission or playing of music and other audio by the glasses 100 through bone conduction speakers 110. In some embodiments, the temples 102 may transmit music and other audio by the glasses 100 through in-ear or over-ear headphones disposed near the temple tips 114.

In accordance with several embodiments of the present invention, the present disclosure enables systems and methods for providing glasses as a service (GaaS).

In some examples, providing the present invention as a service is cost effective for users. For example, purchasers or users of smartglasses temples described herein can be provided a plurality of front frames of different styles, shapes, and colors pursuant to on a monthly subscription for a fixed price such that a user may have a first device and may sign up for a subscription to receive a new selection of front frames described herein every month, year, or other selected subscription period of time. The front frames and temples can use any of the hinges, hinge elements receiving holes described herein.

The inventions described herein, including those embodiments with vibrating transducer speakers, replaceable front frames that contain no electronic wiring to facilitate the easy removal and connection of the front frame without requiring the disconnection of any electronic wires affecting the connectivity and functions of the smartglasses have enabled the weight of the glasses to be reduced significantly. Smartglasses described herein with the vibrating transducer speakers described herein and the front frames connected to the temples weigh less than 1.45 ounces, providing a significant improvement in comfort for smartglasses that are intended to be worn for longer time periods.

A method for providing glasses as a service (GaaS) for smartglasses described herein can be provided comprising providing via a smartglasses service provider interface one or more temples comprising speakers and a microphone and wireless technology for pairing or connecting the temples to a mobile phone, tablet, or other smart device or system and receiving holes for receiving hinge elements of front frames; providing a subscription to a plurality of frames of different shapes and styles comprising hinge elements adapted to releasably connect to the temples at the receiving holes without affecting the wireless technology for pairing or connecting the temples to a mobile phone, tablet, or other smart device or system; receiving a selection of one or more front frames for the temples and a selected period for the subscription from a subscriber via the service provider interface; and providing the selected front frames to the subscriber in response to the received selection for use over a period of the subscription.

A system for and method of offering and selling smartglasses comprising providing via a smartglasses seller interface one or more temples comprising temples comprising speakers and a microphone and wireless technology for pairing or connecting the temples to a mobile phone, tablet, or other smart device or system and receiving holes for receiving hinge elements of front frames, one or more frames of different shapes and styles comprising hinge elements adapted to releasably connect to the temples at the receiving holes without affecting the wireless technology for pairing or connecting the temples to a mobile phone, tablet, or other smart device or system, one or more lenses configured to be fit into the one or more frames; receiving selections of one of the temples, one of the frames, and one of the lenses; generating an image of the selected temples, frames, and lenses into fully assembled smartglasses and providing the image and a link to purchase the fully assembled smartglasses and a purchase price via the smartglasses seller interface; receiving at the smartglasses seller interface a request to purchase the fully assembled smartglasses or components of the fully assembled smartglasses; and shipping the fully assembled smartglasses or the components to the purchaser in response to the purchase request.

The present system may be readily realized in a network communications system. The system includes one or more client devices, and one or more host devices. The system may include a variety of client devices, such as desktop computers and the like, which typically include a display, which is a user display for providing information to users, and various interface elements as will be discussed in further detail below. A client device may be a mobile device, which may be a cellular phone, a personal digital assistant, a laptop computer, a tablet computer, etc. The client devices may communicate with the host device via a connection to one or more communications channels such as the Internet or some other data network, including, but not limited to, any suitable wide area network or local area network. It should be appreciated that any of the devices described herein may be directly connected to each other instead of over a network. Typically, one or more servers may be part of the network communications system, and may communicate with host servers and client devices.

One host device may interact with a large number of users at a plurality of different client devices. Accordingly, each host device is typically a high end computer with a large storage capacity, one or more fast microprocessors, and one or more high speed network connections. Conversely, relative to a typical host device, each client device typically includes less storage capacity, a single microprocessor, and a single network connection. It should be appreciated that a user as described herein may include any person or entity which uses the presently disclosed system and may include a consumer or purchaser of smartglasses.

Typically, host devices and servers store one or more of a plurality of files, programs, databases, and/or web pages in one or more memories for use by the client devices, and/or other host devices or servers. A host device or server may be configured according to its particular operating system, applications, memory, hardware, etc., and may provide various options for managing the execution of the programs and applications, as well as various administrative tasks. A host device or server may interact via one or more networks with one or more other host devices or servers, which may be operated independently.

The electrical systems of an example computing device (e.g., a client device, and a host device includes a main unit which preferably includes one or more processors electrically coupled by an address/data bus to one or more memory devices, other computer circuitry, and one or more interface circuits. The processor may be any suitable processor, such as a microprocessor from the INTEL PENTIUM® family of microprocessors. The memory preferably includes volatile memory and non-volatile memory. Preferably, the memory stores a software program that interacts with the other devices in the system as described below. This program may be executed by the processor in any suitable manner. In an example embodiment, memory may be part of a "cloud" such that cloud computing may be utilized by computing devices. The memory may also store digital data indicative of documents, files, programs, web pages, etc. retrieved from a computing device and/or loaded via an input device.

Interfaces can include the smartglasses seller and service provider interfaces discussed above.

Interface circuits may be implemented using any suitable interface standard, such as an Ethernet interface and/or a Universal Serial Bus (USB) interface. One or more input devices may be connected to the interface circuit for entering data and commands into the main unit. For example, the input device may be a keyboard, mouse, touch screen, track pad, track ball, isopoint, image sensor, character recognition, barcode scanner, microphone, and/or a speech/voice recognition system. One or more displays, printers, speakers, and/or other output devices may also be connected to the main unit via the interface circuit. The display may be a cathode ray tube (CRTs), a liquid crystal display (LCD), or any other type of display. The display generates visual displays generated during operation of the computing device. For example, the display may provide a smartglasses seller or service provider interface, which may display one or more web pages received from a computing device. An interface may include prompts for human input from a user including links, buttons, tabs, checkboxes, thumbnails, text fields, drop down boxes, etc., and may provide various outputs in response to the user inputs, such as text, still images, videos, audio, and animations.

One or more storage devices may also be connected to the main unit via the interface circuit. For example, a hard drive, CD drive, DVD drive, and/or other storage devices may be connected to the main unit. The storage devices may store any type of data, such as pricing data, transaction data, operations data, inventory data, commission data, manufacturing data, image data, video data, audio data, tagging data, historical access or usage data, statistical data, security data, etc., which may be used by the computing device.

The computing device may also exchange data with other network devices via a connection to the network. Network devices may include one or more servers, which may be used to store certain types of data, and particularly large volumes of data which may be stored in one or more data repository. A server may include any kind of data including databases, programs, files, libraries, pricing data, transaction data, operations data, inventory data, commission data, manufacturing data, configuration data, index or tagging data, historical access or usage data, statistical data, security data, etc. A server may store and operate various applications relating to receiving, transmitting, processing, and storing the large volumes of data. It should be appreciated that various configurations of one or more servers may be used to support and maintain the system. Also, certain data may be stored in a client device which is also stored on the server, either temporarily or permanently, for example in memory or storage device. The network connection may be any type of network connection, such as an Ethernet connection, digital subscriber line (DSL), telephone line, coaxial cable, wireless connection, etc.

Access to a computing device can be controlled by appropriate security software or security measures. An individual users' access can be defined by the computing device and limited to certain data and/or actions. Accordingly, users of the system may be required to register with one or more computing devices.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of" In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The invention claimed is:

1. A smartglasses device comprising:
a removable and replaceable front frame, the front frame comprising hinges and rims, the rims comprising lenses;
temples releasably connected to the hinges, wherein the hinges and the temples connect by a friction fit and at least one of the temples comprise electronics components configured and programmed to transmit and receive electronic signals;
wherein the front frame is configured to be removed from each of the temples and replaced without affecting any electronic connection between the temples and the front frame or any device electronically paired or connected to the temples; and
wherein at least one of the temples comprises a printed circuit board, battery, microphone, speakers, connectivity module, cellular communications unit and hardware, and artificial intelligence interface in electronic communication,
the connectivity module and the cellular communications unit and hardware configured and programmed to pair or connect the smartglasses to a smartphone, smartwatch, or other devices or systems and support active priority for the smartphone, the smartwatch, or the other device or systems, the smartglasses configured and programmed to receive oral requests or commands at the microphone and artificial intelligence interface to perform mobile device tasks or applications and process and communicate the oral requests or commands to a mobile device application controlling paired or connected devices or systems used for display or presentation of information related to the requested or commanded tasks or applications, the mobile device application and the artificial intelligence interface are programmed or configured to control paired or connected devices used for display or presentation of information related to requested or commanded tasks or applications and to display or present information related to the requested or commanded tasks or applications on the smartglasses, a paired or connected smartwatch, smartphone, or other paired or connected devices or systems, based on default settings, and to activate connections between the paired or connected smartglasses, smartphone, the smartwatch or additional devices or systems having higher priority until a capacity for connection with the smartglasses, the smartphone, the smartwatch, or other paired or connected devices or systems is reached, and receive at the microphone oral commands to override or switch the default settings and display or present information on a paired or connected as specified in the override or switch commands at the microphone and artificial intelligence and process and communicate the oral requests or commands to the mobile device application controlling paired or connected devices used for display or presentation of information related to requested or commanded tasks or applications switch display from a mobile device specified in the default settings to the paired or connected device or devices specified in the switch or override command.

2. The smartglasses of claim 1, further comprising a smartglasses mobile application, wherein the mobile device application controlling paired or connected devices used for display or presentation of information related to requested or commanded tasks or applications is the smartglasses mobile application.

3. The smartglasses of claim 1, wherein the front frame contains no electrical wiring that connects to the temples.

4. The smartglasses of claim 1, wherein the speakers are vibrating transducer speakers and weigh less than 1.45 ounces when the front frames and the temples are connected.

5. The smartglasses of claim 1, wherein the hinges each comprise an insert component having a first end pivotally connected to the front frame and a second end adapted to releasably connect with corresponding temple receiving holes.

6. The smartglasses of claim 5, wherein each insert component is substantially flat.

7. The smartglasses of claim 5, wherein each insert component further comprises one or more tab elements substantially corresponding in size and orientation to openings in one or more interior side walls of the receiving holes to selectively secure the temples to the front frame.

8. The smartglasses of claim 1, wherein the hinges are pivot hinges having rounded profiles that releasably connect to the temples at receiving holes of corresponding size in the temples.

9. A smartglasses device, comprising:
a front frame comprising a bridge member connecting a pair of rims having a pair of lenses disposed therein, and a pair of hinge elements each comprising an insert component having a first end opposite a second end, with the first end pivotally connected to the front frame, each insert component further comprising an actuator release button configured to prompt the attachment or removal of the temples from the front frame; and
a pair of temples, each having a hinge receiving hole adapted to releasably connect with the second end of the insert component, at least one of the temples further comprising a connectivity module configured to wirelessly connect the temples to a mobile device; and
wherein the front frame is configured to be removed from each of the temples and replaced without affecting any electronic connection between the temples and the front frame or any devices paired or connected to the temples.

10. The smartglasses of claim 9, wherein the insert components are substantially flat and releasably connect to corresponding receiving holes in the temples by means of a friction fit.

11. The smartglasses of claim 10, wherein each of the hinges further comprises one or more tab elements substantially corresponding in size and orientation to openings in one or more interior side walls of the receiving holes to selectively secure the temples to the front frame.

12. The smartglasses of claim 9, wherein each of the hinges are flexible and spring loaded.

13. The smartglasses of claim 9, wherein the hinges enable the temples to be extended beyond ninety degrees relative to the front frame.

14. A smartglasses device, comprising:
a front frame comprising a bridge member connecting a pair of rims having a pair of lenses disposed therein, and a pair of hinge elements each comprising an insert component pivotally connected to the front frame by a hinge, the insert component having an interior sidewall with a width and formed with a protruding tab which spans the entire width of the insert component interior sidewall; and
a pair of temples, each having a hinge receiving hole adapted to receive at least a portion of the insert component and being formed with an opening on an interior sidewall of the temple corresponding to and sized to accommodate the protruding tab of the insert component, at least one of the temples further comprising a connectivity module configured to wirelessly connect the temples to a mobile device;
wherein the protruding tabs of the insert components are accessible through the sidewall openings of the temples when the temples and the front frames are connected.

15. The smartglasses device of claim 14, wherein the hinge is a barrel hinge.

16. The smartglasses of claim 14, wherein compression of the protruding tab enables release of the insert components from within the receiving holes of the temples.

17. The smartglasses of claim 14, wherein each of the protruding tabs of the insert components comprise an actuator release button configured to prompt the attachment or removal of the temples from the front frame.

* * * * *